(12) United States Patent
Wang et al.

(10) Patent No.: US 11,671,573 B2
(45) Date of Patent: Jun. 6, 2023

(54) USING REINFORCEMENT LEARNING AND PERSONALIZED RECOMMENDATIONS TO GENERATE A VIDEO STREAM HAVING A PREDICTED, PERSONALIZED, AND ENHANCE-QUALITY FIELD-OF-VIEW

(71) Applicant: International Business Machines Corporation, Armonk, NY (US)

(72) Inventors: Tao Wang, Beijing (CN); Shi Lei Zhang, Beijing (CN); Lingyun Wang, Beijing (CN); Qing Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 17/120,439

(22) Filed: Dec. 14, 2020

(65) Prior Publication Data
US 2022/0191453 A1  Jun. 16, 2022

(51) Int. Cl.
*H04N 13/117* (2018.01)
*H04N 13/122* (2018.01)
(Continued)

(52) U.S. Cl.
CPC ............ *H04N 13/117* (2018.05); *G06N 3/08* (2013.01); *H04N 13/122* (2018.05);
(Continued)

(58) Field of Classification Search
CPC .. H04N 13/117; H04N 13/122; H04N 13/139; H04N 13/156; H04N 19/167;
(Continued)

(56) References Cited

U.S. PATENT DOCUMENTS 10,595,069 B2 *  3/2020  Swaminathan ....... H04L 65/605
10,863,159 B2 * 12/2020  Oh ........................ H04N 13/117
(Continued)

OTHER PUBLICATIONS

Xu et al. ( M. Xu, Y. Song, J. Wang, M. Qiao, L. Huo and Z. Wang, "Predicting Head Movement in Panoramic Video: A Deep Reinforcement Learning Approach," in IEEE Transactions on Pattern Analysis and Machine Intelligence, vol. 41, No. 11, pp. 2693-2708, Nov. 1, 2019, doi: 10.1109/TPAMI.2018.2858783.) (Year: 2019).*

(Continued)

*Primary Examiner* — Christopher S Kelley
*Assistant Examiner* — Ana Picon-Feliciano
(74) *Attorney, Agent, or Firm* — Cantor Colburn LLP; Jared Chaney

(57) ABSTRACT

Embodiments of the invention are directed to a computer-implemented method that includes using a reinforcement learning (RL) system to generate a first set of displayed region candidates based on inputs received from online users while watching video. A recommendation system is used to rank the first set of displayed region candidates based on inputs received from a local user watching video. The recommendation system is further used to select a first highest ranked one of the first set of displayed region candidates. Based on the first highest ranked one of the first set of displayed region candidates, a first section of a first raw video frame is fetched that matches the first highest ranked one of the first set of displayed candidate regions, wherein the first section of the first raw video frame includes a first predicted display region of the video frame.

20 Claims, 17 Drawing Sheets

(51) Int. Cl.
| | |
|---|---|
| *G06N 3/08* | (2023.01) |
| *H04N 13/139* | (2018.01) |
| *H04N 13/156* | (2018.01) |
| *G06T 9/00* | (2006.01) |
| *H04N 19/59* | (2014.01) |
| *H04N 19/167* | (2014.01) |
| *H04N 19/23* | (2014.01) |
| *H04N 21/218* | (2011.01) |
| *H04N 21/442* | (2011.01) |
| *H04N 21/2343* | (2011.01) |
| *H04N 21/434* | (2011.01) |
| *H04N 21/4402* | (2011.01) |
| *H04N 21/81* | (2011.01) |
| *H04N 21/44* | (2011.01) |
| *H04N 21/466* | (2011.01) |
| *H04N 21/4728* | (2011.01) |
| *H04N 21/432* | (2011.01) |

(52) U.S. Cl.
CPC ......... *H04N 13/139* (2018.05); *H04N 13/156* (2018.05); *G06T 9/002* (2013.01); *H04N 19/167* (2014.11); *H04N 19/23* (2014.11); *H04N 19/59* (2014.11); *H04N 21/21805* (2013.01); *H04N 21/23439* (2013.01); *H04N 21/4325* (2013.01); *H04N 21/4347* (2013.01); *H04N 21/44008* (2013.01); *H04N 21/44222* (2013.01); *H04N 21/440245* (2013.01); *H04N 21/4667* (2013.01); *H04N 21/4728* (2013.01); *H04N 21/816* (2013.01)

(58) Field of Classification Search
CPC .. H04N 19/23; H04N 19/59; H04N 21/21805; H04N 21/23439; H04N 21/4325; H04N 21/4347; H04N 21/44008; H04N 21/440245; H04N 21/44222; H04N 19/85; H04N 21/234327; H04N 21/234345; H04N 21/251; H04N 21/44218; H04N 21/4667; H04N 21/4728; H04N 21/6587; H04N 21/816; G06N 3/08; G06N 3/006; G06N 3/084; G06N 7/01; G06T 9/002
USPC .......................................................... 348/53
See application file for complete search history.

(56) References Cited

U.S. PATENT DOCUMENTS

| | | | | |
|---|---|---|---|---|
| 10,943,379 | B2* | 3/2021 | Vembar | G06T 9/00 |
| 11,010,632 | B2* | 5/2021 | Han | H04N 13/344 |
| 11,012,727 | B2* | 5/2021 | Hall | H04N 21/4728 |
| 2016/0353146 | A1* | 12/2016 | Weaver | H04N 21/2662 |
| 2018/0001205 | A1* | 1/2018 | Osman | A63F 13/5375 |
| 2018/0295375 | A1* | 10/2018 | Ratner | G06T 7/12 |
| 2019/0354174 | A1* | 11/2019 | Young | G09G 5/391 |
| 2019/0356894 | A1 | 11/2019 | Oh | |
| 2019/0364261 | A1* | 11/2019 | Hwang | H04N 21/85406 |
| 2019/0373244 | A1* | 12/2019 | Bak | H04N 13/111 |
| 2020/0128279 | A1* | 4/2020 | Han | H04N 21/2402 |
| 2020/0128280 | A1* | 4/2020 | Han | H04N 21/251 |
| 2020/0145647 | A1* | 5/2020 | Han | H04N 5/445 |
| 2020/0177927 | A1* | 6/2020 | Yang | H04N 21/234345 |

OTHER PUBLICATIONS

Chen et al., "Dynamic Adaptive Streaming based on Deep Reinforcement Learning", ICSP 2019, Journal of Physics Conference Series, 6 pages.

Chen et al., "Enhancing high-resolution 360 streaming with view prediction", Facebook Engineering, Posted on Apr. 19, 2017, 10 pages, <https://engineering.fb.com/virtual-reality/enhancing-high-resolution-360-streaming-with-view-prediction/>.

Ge et al., "Toward QoE-Assured 4K Video-on-Demand Delivery Through Mobile Edge Virtualization With Adaptive Prefetching", IEEE Transactions on Multimedia, vol. 19, No. 10, Oct. 2017, 16 pages.

Hosseini et al., "Adaptive 360 VR Video Streaming: Divide and Conquer!", arXiv:1609.08729v5 [cs.MM] Nov. 17, 2017, 6 pages.

Huang et al., "QARC: Video Quality Aware Rate Control for Real-Time Video Streaming via Deep Reinforcement Learning", arXiv:1805.02482v3 [cs.MM] Oct. 27, 2018, 10 pages.

Huang et al., "QoE-Oriented Resource Allocation for 360-degree Video Transmission over Heterogeneous Networks", arXiv:1803.07789v1 [cs.MM] Mar. 21, 2018, 2 pages.

Yang et al., "Towards the Instant Tile-Switching For Dash-Based Omnidirectional Video Streaming: Random Access Reference Frame", Downloaded on Jun. 30, 2020, © 2020 IEEE, 6 pages.

* cited by examiner

USING REINFORCEMENT LEARNING AND PERSONALIZED RECOMMENDATIONS TO GENERATE A VIDEO STREAM HAVING A PREDICTED, PERSONALIZED, AND ENHANCE-QUALITY FIELD-OF-VIEW

BACKGROUND

The present invention relates in general to programmable computers. More specifically, the present invention relates to computing systems, computer-implemented methods, and computer program products configured and arranged to utilize reinforcement learning systems in combination with personalized recommendation algorithms to generate a video stream (e.g., 360-degree video/games) having a predicted, personalized, and enhanced-quality field-of-view (FOV).

360-degree videos, also known as immersive videos or spherical videos, are video recordings where a view in every direction is recorded at the same time using, for example, an omnidirectional camera or a collection of cameras. An immersive 360-degree video system is a computer system configured to generate and display immersive 360-degree video images that can simulate a real world experience that a person can enter and leave at any time using technology. The basic components of a 360-degree video system includes a display; a computing system; and various feedback components that provide inputs from the user to the computing system. In some implementations of a 360-degree video system, the display can be integrated within a head-mounted device (HMD) worn by the user and configured to deliver sensory impressions to the human senses (sight, sound, touch, smell, and the like) that mimic the sensory impressions that would be delivered to the human senses by the corresponding actual environment being displayed through the video. The type and the quality of these sensory impressions determine the level of immersion and the feeling of presence in the 360-degree video system. Other outputs provided by the HMD can include audio output and/or haptic feedback. The user can further interact with the HMD by providing inputs for processing by one or more components of the HMD. For example, the user can provide tactile inputs, voice commands, and other inputs while the HMD is mounted to the user's head.

Both stand-alone displays and displays that are integrated within the HMD are typically smaller than the full 360-degree video frame, so only a portion of the full 360-degree video frame is displayed at one time. The user's FOV is typically smaller than the display, so the user is typically only able to focus on the portion of the display that is within the user's FOV.

SUMMARY

Embodiments of the invention are directed to a computer-implemented method that includes using a reinforcement learning (RL) system to generate a first set of displayed region candidates based on inputs received from online users while watching video. A recommendation system is used to rank the first set of displayed region candidates based on inputs received from a local user watching video. The recommendation system is further used to select a first highest ranked one of the first set of displayed region candidates. Based on the first highest ranked one of the first set of displayed region candidates, a first section of a first raw video frame is fetched that matches the first highest ranked one of the first set of displayed candidate regions, wherein the first section of the first raw video frame includes a first predicted display region of the video frame.

Embodiments of the invention are also directed to computer systems and computer program products having substantially the same features as the computer-implemented method described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
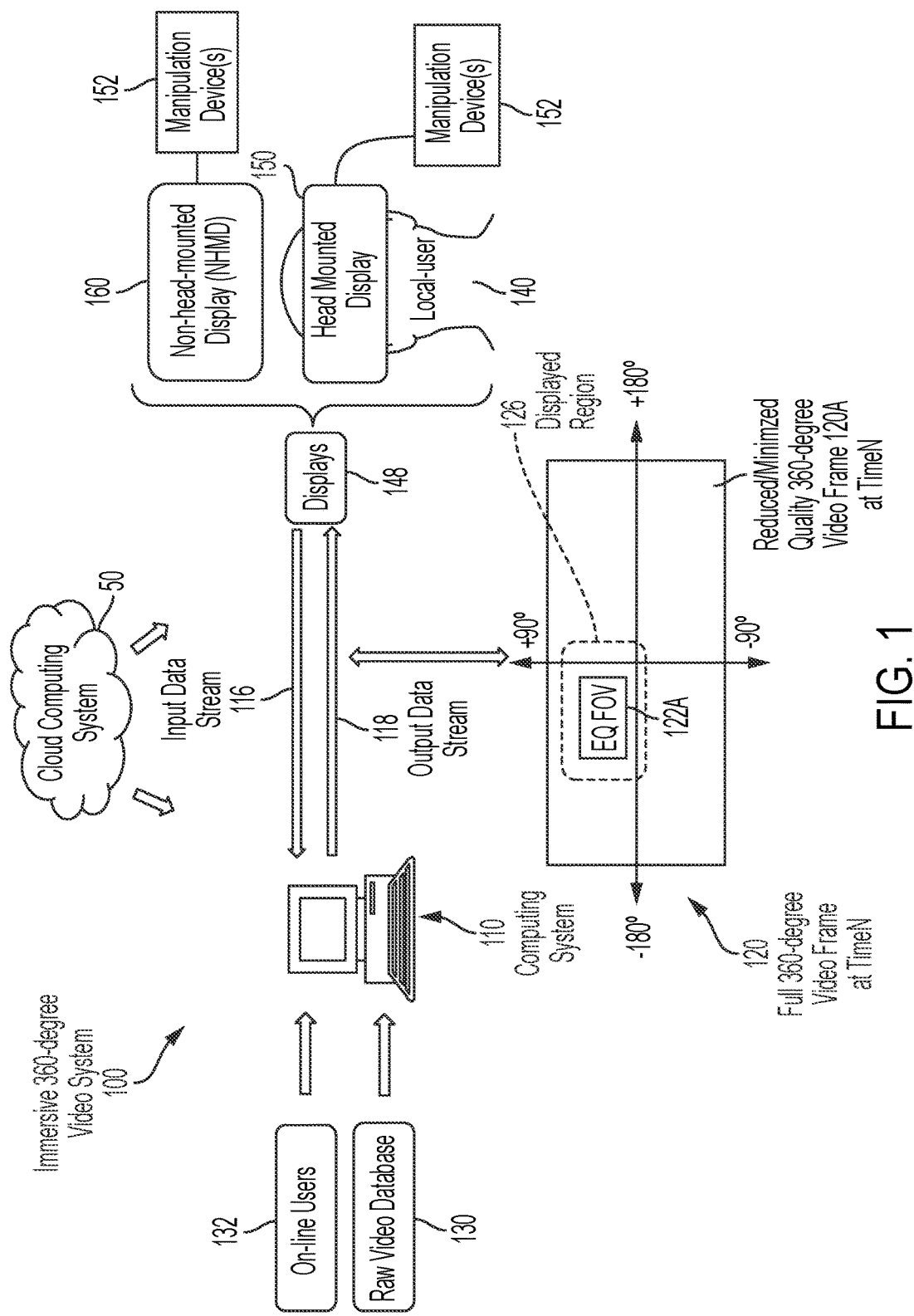
FIG. 1 depicts a block diagram illustrating a system according to embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

Turning now to an overview of technologies that are relevant to aspects of the invention, video streaming (movies and games) over a network such as the internet has become more and more popular with the rapid growth of multimedia and network communication technologies such as 5G. However, for many video transmissions such as 4K virtual reality (VR) and/or 360-degree video streaming, the bandwidth demands placed on the transmission channel by these technologies can result in streaming delay and/or resolution degradation that reduces the end user's quality of experience (QoE). In general, QoE is a measure of the delight or annoyance a customer experiences when utilizing a service such as web browsing, phone calls, TV broadcasts, and the like.

Turning now to an overview of aspects of the invention, embodiments of the invention provide computing systems, computer-implemented methods, and computer program products that utilize a configuration of machine learning techniques configured and arranged to generate a video stream (e.g., 360-degree video/games) having a predicted, personalized, and enhanced-quality (EQ) field-of-view (FOV). Unless a display is extremely small, a user can only focus on a subset of the display that is within the user's FOV. Additionally, when the video frame (e.g., 360-degree video) is larger than what is shown on the display, the user will need to adjust the portion of the video frame that is being displayed (e.g., using mouse controls) so that his/her preferred FOV is within the portion of the video frame is being displayed. For ease of description, the portion of the full 360-degree video frame (or any video frame that is larger than the display) that will be displayed is referred to herein as the "FOV" or the "displayed-FOV" even though it is understood that the portion of the full 360-degree video frame that will be displayed includes more than the user's FOV. Embodiments of the invention utilize a configuration of machine learning techniques trained to perform the task of predicting the user's preferred FOV so the system can, once trained, automatically display the user's predicted/preferred FOV without requiring the user to actually adjust what portion of the video frame is shown on the display, thereby improving the user's QoE. To reduce the likelihood of bandwidth-based streaming delays and/or resolution degradation that can further reduce QoE, embodiments of the invention apply one or more bandwidth management technique (e.g., adaptive bit rate (ABR)) to the predicted FOV, while allowing the portion of the video frame that is outside the predicted FOV to be transmitted with a minimized or reduced video quality.

In embodiments of the invention, the machine learning techniques used to predict the user's preferred FOV includes a coarse-grain FOV prediction technique and a fine-grain and personalized FOV prediction technique. In embodiments of the invention, the coarse-grain FOV prediction technique can be a reinforcement learning algorithm trained to automatically make a coarse-grain prediction of the user's preferred next FOV by generating a list of user-preferred next FOV candidates based on remote or online video state data and remote or online user behavior data received from a large number of remote or online users while they are actively watching video. In general, reinforcement learning techniques can be categorized as behavioral learning models. The reinforcement learning algorithm receives feedback from the analysis of the data so the user is guided to the best outcome. Reinforcement learning differs from other types of supervised learning because the system isn't trained with the sample data set. Rather, the system learns through trial and error. Therefore, a sequence of successful decisions will result in the process being "reinforced" because it best solves the problem at hand.

In embodiments of the invention, the remote/online user behavior data and the remote/online video state data can be transmitted for processing and analysis through network-based and/or cloud-based transmissions. In embodiments of the invention, the remote/online user behavior data can include but is not limited to the online users' selections of FOVs that will be displayed; the online users' region(s)-of-interest (ROI) within the online-user-selected FOV; indications that the online users like or do not like their displayed-FOV; and/or the length of time (dwell time) that the online users spend on their displayed-FOV. In general, a user's ROI is the portions or details of a FOV that the user prioritizes based on the user's interests. Away from the center of a human's FOV, the ability to resolve details decreases dramatically, such that by just 20-degrees off-center the eyes resolve only one-tenth as much detail. At the periphery of a human's FOV, only large-scale contrast and minimal color are detected. Accordingly, in order to resolve, assemble, and prioritize details (i.e., identify ROIs) in the FOV, a human's eyes focus on several ROIs in rapid succession to, in effect, paint a mental perception of the image and what it means to the person. The end result is a mental image with details (i.e., ROIs) that have been effectively prioritized based on the person's interest. The online video state data includes but is not limited to the types of video (e.g., action movie, drama movie, sporting event, animated game, etc.) being watched by the online users; the name(s) of the video(s) being watched by the online users; the online users' dwell times for their displayed-FOVs; current state information about the videos being watched by the online users; video history (i.e., a log of the past video states); remaining video (time, quantity, etc.); video bandwidth requirements; video transmission buffer size; and the like.

In embodiments of the invention, the fine-grain FOV prediction technique ranks the list of preferred next FOV candidates based on local users' attribute data (i.e., "local-user attribute data") and local users' behavior data (i.e., "local-user behavior data"), which are gathered from one or more local users as they use the system to locally watch a video. The fine-grain FOV prediction technique outputs the highest ranked FOV candidate as the preferred/predicted next FOV. In embodiments of the invention, the fine-grain FOV prediction technique can be implemented using a personalized recommendation system configured and arranged to rank the list of preferred next FOV candidates using the local-user attribute data and the local-user behavior data. In embodiments of the invention, the local-user behavior data can be substantially the same as the remote/online user behavior data, and the local-user attribute data can include metadata collected from local users who use the system to watch video. The collected metadata can be information relating to explicit interactions with the system, for example, information about the local user's past activity, the local user's ratings, reviews and other information about the local user's profile, such as viewing preferences. These explicit interactions can be combined with implicit interactions such as the device used for access, clicks on a link, location, and dates.

In embodiments of the invention, the recommendation system can be implemented as machine learning algorithm (or model) trained to perform the task of dynamically and adaptively ranking the list of preferred next FOV candidates based on the local-user attribute data and the local-user behavior data. The overall system, and more specifically the recommendation system, is dynamically adaptable in that it is responsive to changes in the local-user behavior data. For example, if a predicted displayed-FOV is not suitable to a local-user, the local-user will make adjustments to the predicted displayed-FOV, and the recommendation system will take these adjustments into account for the next predicted displayed-FOV by updating the training of its machine learning algorithm/model (e.g., by setting higher ranking weights for the most recently received local-user adjustments). Multiple iterations of this process of local-user adjustments followed by corresponding model updates are executed until the recommendation system has adapted to the new local-user preferences, and the local-user is no longer making local-user adjustments to the predicted displayed-FOV, thereby improving the local-user's QoE. To reduce the likelihood of bandwidth-based streaming delays and/or resolution degradation that can further reduce QoE, a video streaming service module fetches the predicted displayed-FOV from a database of raw video and applies one or more bandwidth management technique (e.g., adaptive bit rate (ABR)) to the predicted displayed-FOV, while allowing the portion of the video frame that is outside the predicted displayed-FOV to be transmitted with a minimized or reduced video quality.

Turning now to a more detailed description of the aspects of the invention, FIG. 1 depicts a diagram illustrating an immersive 360-degree video system 100 according to embodiments of the invention. In embodiments of the invention, the system 100 includes a programmable computer 110 and displays 148. In embodiments of the invention, the displays 148 can implemented as a head mounted display (HMD) 150 or a non-HMD (NHMD) 160. The NHDM 160 can be a stand-alone flat panel display or a flat panel display integrated with another device such as a smartphone or a laptop. The HMD 150 is configured to be worn by a local user 140. Both the HMD 150 and the NHMD 160 can be in wired or wireless communication with manipulation device(s) 152 (e.g., a three-dimensional mouse, data gloves, etc.) configured to be worn by and/or otherwise controlled/used by the local user 140. The computing system 110 is in wired and/or wireless communication with the display(s) 148. A large number of on-line users 132 and a raw video database are in wired or wireless communication with the computing system 110. Additionally, a cloud computing system 50 (also shown in FIG. 12) is in wired or wireless electronic communication with the immersive 360-degree video system 100. The cloud computing system 50 can supplement, support or replace some or all of the functionality (in any combination) of the system 100. Additionally, some or all of the functionality of the system 100 can be implemented as a node 10 (shown in FIGS. 28 and 29) of the cloud computing system 50.

The computing system 110 executes coarse-grain and fine-grain software algorithms configured and arranged to use online user behavior data and online video state data received from the online users 132, along with local user behavior data and local user attribute data in input data stream 116 received from the user 140 (via display(s) 148) to generate the output data stream 118 and provide it to the display(s) 148. In embodiments of the invention, the displays 148 can be configured to support a function-API (application program interface) that allows remote and local users to input online user behavior data and local user behavior data (e.g., adjust the displayed region 126) to be input to the system 100 flexibly. In accordance with embodiments of the invention, the output data stream 118 includes a full 360-degree video frame 120 shown at a time denoted as TimeN. The full 360-degree video frame 120 is depicted as an equirectangular mapped 360 degree video frame where the yaw angle (−180 to +180 degrees) and the pitch angle (−90 to +90 degrees) are mapped to the x-axis and the y-axis, respectively. The full 360-degree video frame 120 is a video recordings where a view in every direction is recorded at the same time, shot using an omnidirectional camera or a collection of cameras. During playback on normal flat display (e.g., the NHMD 160) the local user 140 has control of the viewing direction like a panorama. The full 360-degree video frame 120 can also be played on displays or projectors arranged in a sphere or some part of a sphere (not shown). The displayed region 126 (also known as the visible area or the user's viewport) of the full 360-degree video frame 120 can be displayed on the displays 148. In embodiments of the invention where the display 148 is incorporated within the HMD 150, immersive (i.e., 3D) views of the full 360-degree video frame 120 can be displayed to the local user 140 on a display (e.g., display 306 shown in FIG. 3) of the HMD 150, which places tiny screens and lenses close to the eyes of the local user 140 to simulate large screens. As the local user 140 performs actions like walking, head rotating (i.e., changing the point of view), data describing behavior of the local user 140 is fed through the input data stream 116 to the computing system 110 from the HMD 150 and/or the manipulation devices 152. The computing system 110 processes the information in real-time and generates appropriate feedback that is passed back to the user 140 by means of the output data stream 118.

In some embodiments of the invention, the local user 140 has a personal FOV that can be larger or smaller than the displayed region 126. Although some examples described herein reference the local user's FOV, it is understood that the local user's FOV and the displayed region 126 are interchangeable in those examples. In embodiments of the invention, the local user 140 can only focus on a subset of the display 126 that is within the local user's FOV 122A. Additionally, because the 360-degree video frame 120 is larger than what is shown on the displays 148 without undue compression, the location of the displayed region 126 can be adjusted by the local user 140 (e.g., using the manipulation device(s) 152) so that his/her preferred FOV 122A is within the displayed region 126 (or as large as the displayed region 126; or larger than the displayed region 126). For ease of description, the portion of the full 360-degree video frame 120 that will be displayed on the displays 148 can be referred to herein as the "FOV" or the "displayed-FOV" even though it is understood that the displayed region 126 of the full 360-degree video frame 120 can include more or less than the user's FOV 122A.

The coarse-grain and fine-grain software algorithms executed by the computing system 110 include a configuration of machine learning techniques trained to perform the task of predicting the preferred FOV 122A of the local user 140 so the machine learning technique of the system 110 can, once trained, automatically provide the preferred FOV 122A of the local user 140 without requiring the local user 140 to actually adjust the location of the displayed region 126, thereby improving the QoE of the local user 140. To reduce the likelihood of bandwidth-based streaming delays and/or resolution degradation that can further reduce QoE, the computing system 110 is further configured to apply one or more bandwidth management technique (e.g., adaptive bit rate (ABR)) to the predicted FOV 122A (thereby generating an enhanced-quality FOV (EQ FOV) 122A), while allowing the portion of the full 360-degree 120 that is outside the displayed region 126 (or the EQ FOV 126) to be transmitted with a minimized or reduced video quality, which is shown in FIG. 1 as the reduced/minimized quality 360-degree video frame 120A.

In embodiments of the invention, the coarse-grain FOV prediction technique used by the computing system 110 can be a reinforcement learning algorithm trained to automatically make a coarse-grain prediction of the preferred FOV 122A by generating a list of user-preferred next FOV candidates based on remote or online video state data and remote or online user behavior data received from the online users 132 while they are actively watching video. In general, reinforcement learning techniques can be categorized as behavioral learning models. The reinforcement learning algorithm receives feedback from the analysis of the data so the user is guided to the best outcome. Reinforcement learning differs from other types of supervised learning because the system isn't trained with the sample data set. Rather, the system learns through trial and error. Therefore, a sequence of successful decisions will result in the process being "reinforced" because it best solves the problem at hand.

Figure 2A:
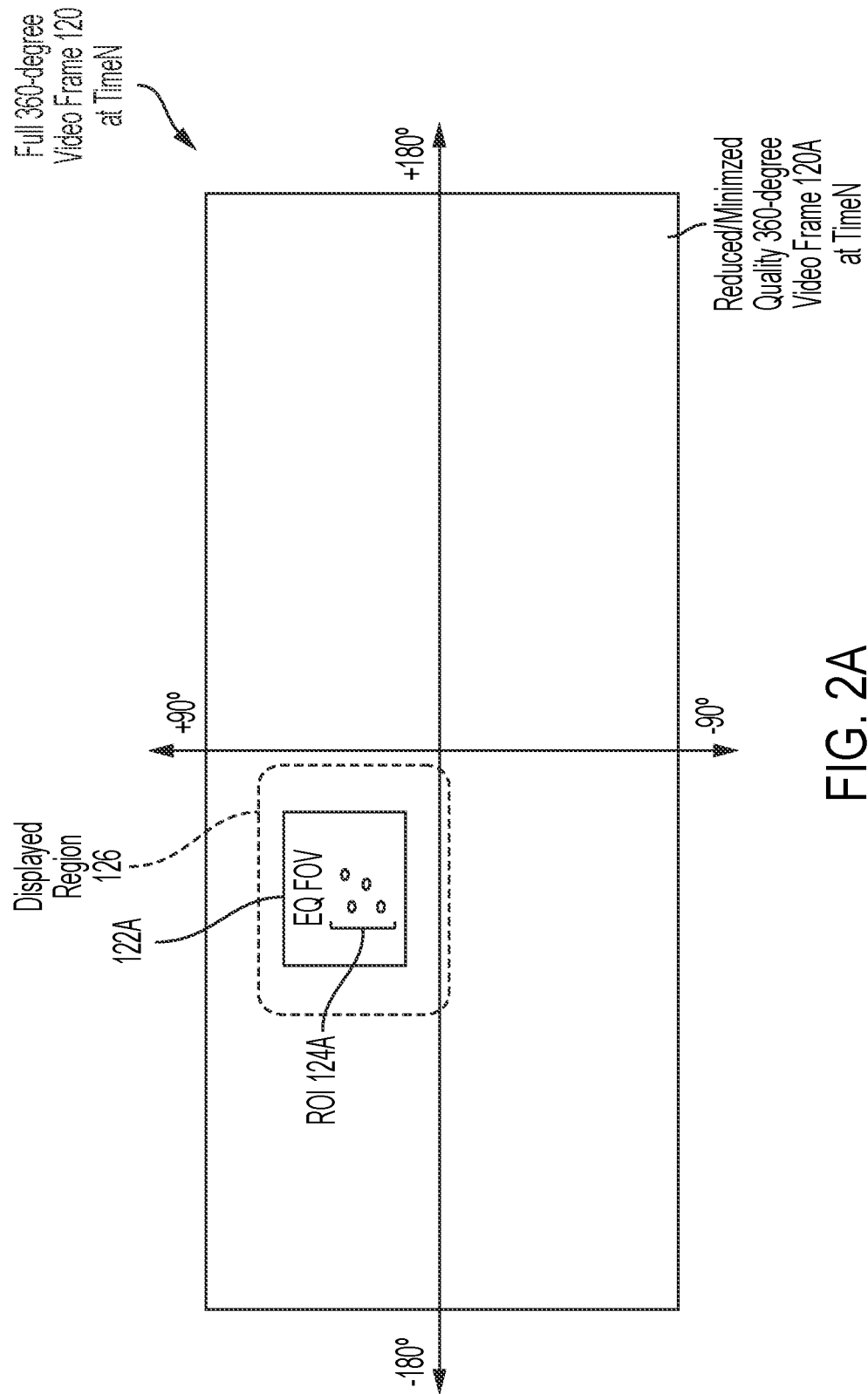
FIG. 2A depicts a block diagram illustrating additional details of a full 360-degree video frame in accordance with embodiments of the invention.

In embodiments of the invention, the online user behavior data can include but is not limited to the FOVs selected by the online users 132; the ROIs of the online users 132 within the online-user-selected FOV; indications that the online users 132 like or do not like their displayed-FOV; and/or the length of time (dwell time) that the online users 132 spend on their displayed-FOV. In general, a user's ROI is the portions or details of a FOV that the user prioritizes based on the user's interests. Away from the center of a human's FOV, the ability to resolve details decreases dramatically, such that by just 20-degrees off-center the eyes resolve only one-tenth as much detail. At the periphery of a human's FOV, only large-scale contrast and minimal color are detected. Accordingly, in order to resolve, assemble, and prioritize details (i.e., identify ROIs) in the FOV, a human's eyes focus on several ROIs in rapid succession to, in effect, paint a mental perception of the image and what it means to the person. The end result is a mental image with details (i.e., ROIs) that have been effectively prioritized based on the person's interest. An example of the ROIs 124A of the EQ FOV 122A is depicted in FIG. 2A. The online video state data includes but is not limited to the types of video (e.g., action movie, drama movie, sporting event, animated game, etc.) being watched by the online users 132; the name(s) of the video(s) being watched by the online users 132; the online users' dwell times for their displayed-FOVs; current state information about the videos being watched by the online users 132; video history (i.e., a log of the past video states); remaining video (time, quantity, etc.); video bandwidth requirements; video transmission buffer size; and the like.

In embodiments of the invention, the fine-grain FOV prediction technique ranks the list of preferred next FOV candidates based on attribute data of the local user 140 (i.e., "local-user attribute data") and behavior data of the local user 140 (i.e., "local-user behavior data"), which are gathered from the local users 140 as they use the system 100 to locally watch a video. The fine-grain FOV prediction technique outputs the highest ranked FOV candidate as the preferred/predicted FOV 122A. In embodiments of the invention, the fine-grain FOV prediction technique can be implemented using a personalized recommendation system configured and arranged to rank the list of preferred next FOV candidates using the local-user attribute data and the local-user behavior data. In embodiments of the invention, the local-user behavior data can be substantially the same as the remote/online user behavior data, and the local-user attribute data can include metadata collected from local users who use the system to watch video. The collected metadata can be information relating to explicit interactions with the system, for example, information about the local user's past activity, the local user's ratings, reviews and other information about the local user's profile, such as viewing preferences. These explicit interactions can be combined with implicit interactions such as the device used for access, clicks on a link, location, and dates.

In embodiments of the invention, the recommendation system can be implemented as machine learning algorithm (or model) trained to perform the task of dynamically and adaptively ranking the list of preferred next FOV candidates based on the local-user attribute data and the local-user behavior data. The overall system 100, and more specifically the recommendation system, is dynamically adaptable in that it is responsive to changes in the local-user behavior data. For example, if a predicted displayed-FOV 122A is not suitable to the local-user 140, the local-user 140 will make adjustments to the predicted displayed-FOV 122A, and the recommendation system will take these adjustments into account for the next predicted displayed-FOV by updating the training of its machine learning algorithm/model (e.g., by setting higher ranking weights for the most recently received local-user adjustments). Multiple iterations of this process of local-user adjustments followed by corresponding model updates are executed until the recommendation system has adapted to the new local-user preferences, and the local-user 140 is no longer making local-user adjustments to the predicted displayed-FOV, thereby improving the QoE of the local user 140.

Figure 2B:
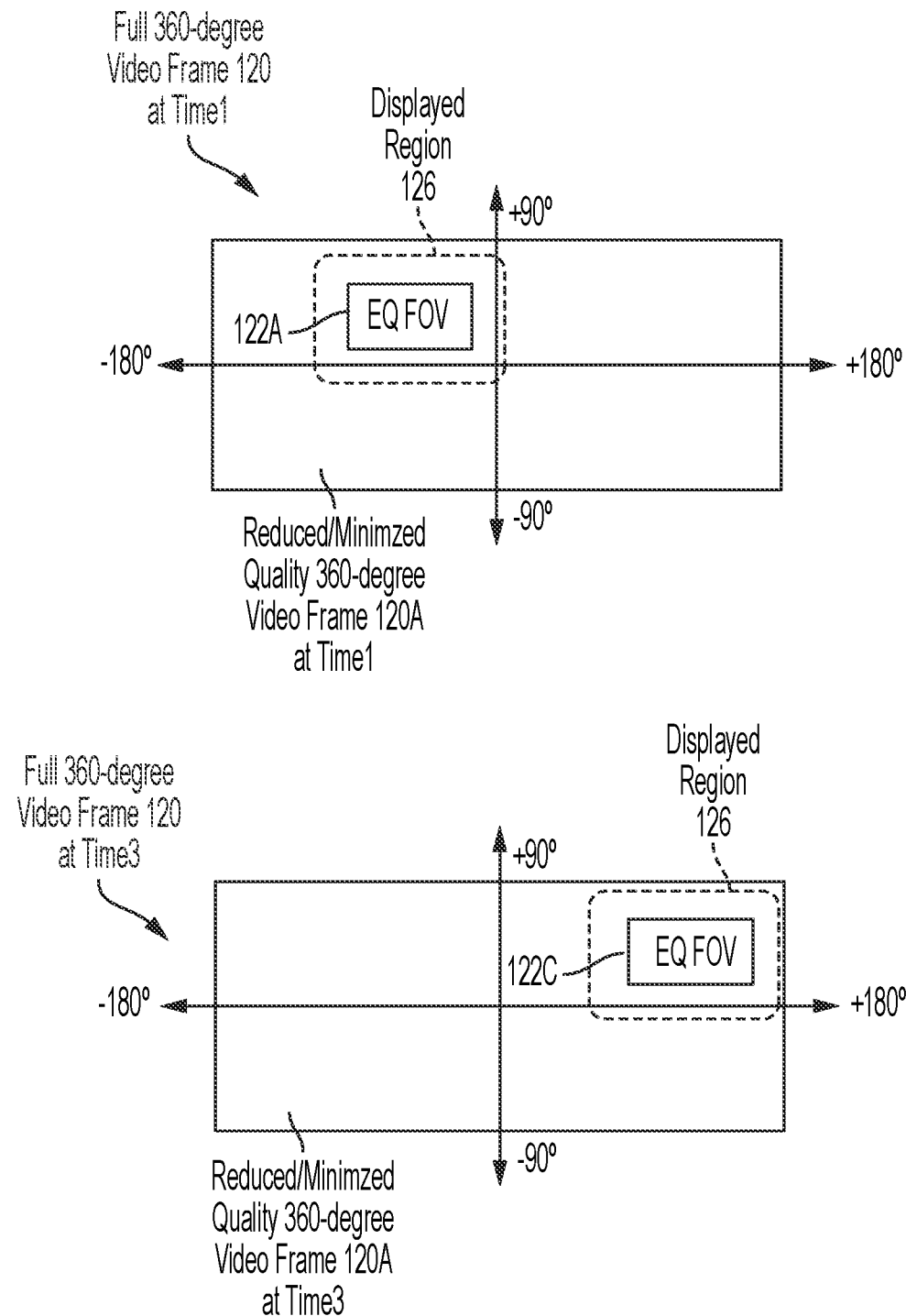
FIG. 2B depicts a sequence of block diagrams illustrating additional details of a full 360-degree video frame in accordance with embodiments of the invention.
Figure 2B:
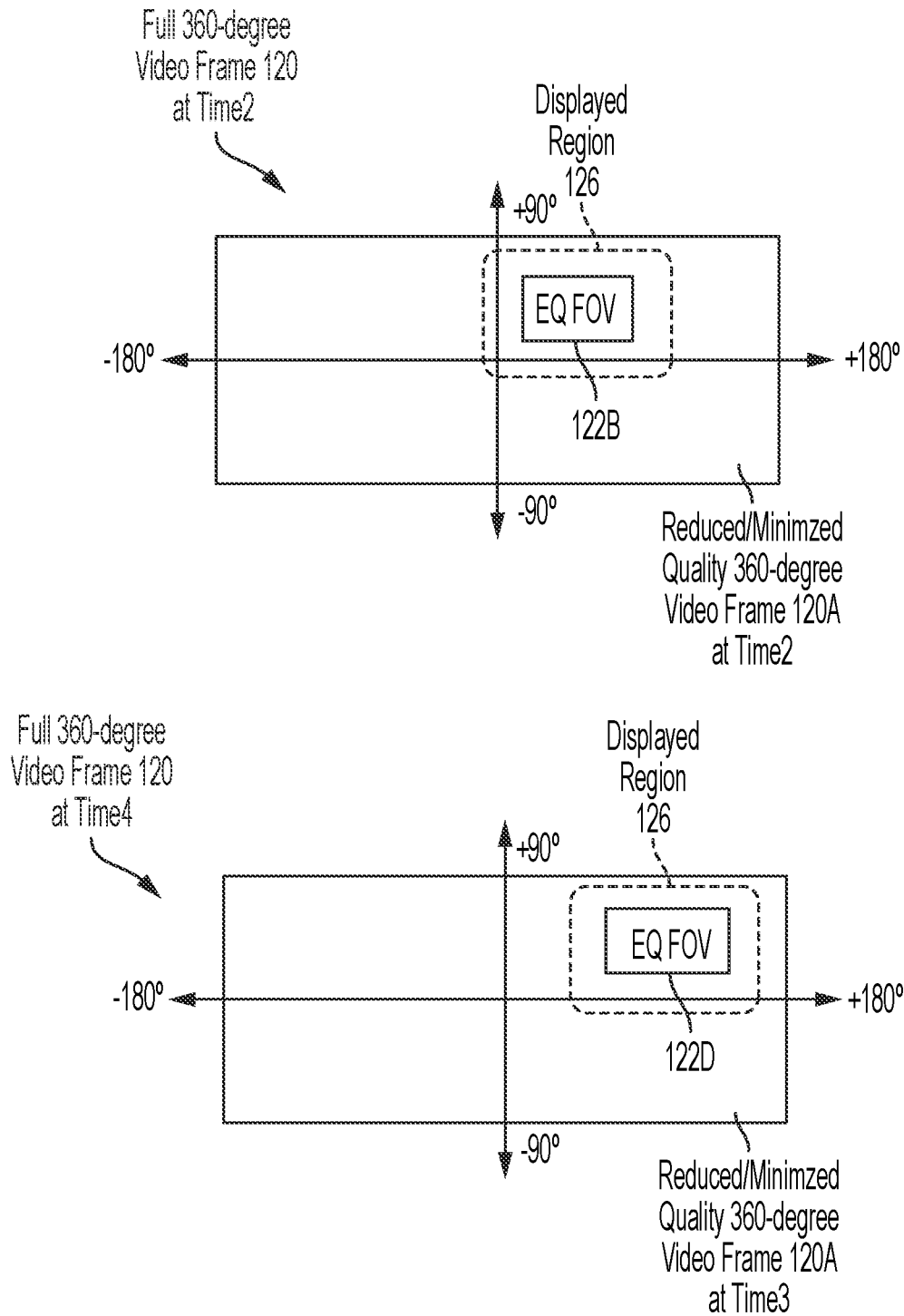

FIG. 2B depicts a sequence of block diagrams illustrating additional details of the full 360-degree video frame 120 at times Time1, Time2, Time3, and Time4 in accordance with embodiments of the invention. The sequence of block diagrams depict four predicted FOVs 122A, 122B, 122C, 122D predicted at times Time1, Time2, Time3, and Time4 by the computing system 110 in accordance with aspects of the invention. As an example, the full 360-degree video frame 120 can be a live video stream of an American football game, and the computing system 110, using the coarse-grain and fine-grain techniques in accordance with aspects of the invention, has determined that the local-user 140 has certain preferences for watching live sporting events, and particularly for watching American football games. More specifically, the computing system 110, using the coarse-grain and fine-grain techniques in accordance with aspects of the invention, has determined that the local-user 140 prefers to view the location of the football while the game clock is running, and prefers to view the coaches and the players on the sidelines for the team that is on offense during timeouts and following a scoring play. At Time1, TeamA (not shown) has the football on the left side of the field, and the computing system 110 predicts that EQ FOV 122A and the corresponding display region 126 should show the left side of the field where the football is located. Subsequent to displaying EQ FOV 122A, the local user 140 does not make any adjustments to EQ FOV 122A, so the computing system 110 using the coarse-grain and fine-grain techniques in accordance with aspects of the invention concludes that the local-user 140 agrees with the prediction of EQ FOV 122A. At Time2, TeamA has advanced the football to the right side of the field, and the computing system 110 predicts that EQ FOV 122B and the corresponding display region 126 should show the right side of the field where the football is located. Subsequent to displaying EQ FOV 122B, the local user 140 does not make any adjustments to EQ FOV 122B, so the computing system 110 using the coarse-grain and fine-grain techniques in accordance with aspects of the invention concludes that the local-user 140 agrees with the prediction of EQ FOV 122B. At Time3, TeamA has scored a touchdown by advancing the football into TeamB's end zone on the far right side of the field, and the computing system 110 predicts that EQ FOV 122C and the corresponding display region 126 should show the end zone at the far right side of the field where the football is located. Subsequent to displaying EQ FOV 122C, the local user 140 does not make any adjustments to EQ FOV 122C, so the computing system 110 using the coarse-grain and fine-grain techniques in accordance with aspects of the invention concludes that the local-user 140 agrees with the prediction of EQ FOV 122C. At Time4, which is just after TeamA has scored a touchdown, the computing system 110 predicts that EQ FOV 122D and the corresponding display region 126 should show the coaches and the players on the sidelines for TeamA, which is the team on offense that just scored a touchdown. Subsequent to displaying EQ FOV 122D, the local user 140 does not make any adjustments to EQ FOV 122D, so the computing system 110 using the coarse-grain and fine-grain techniques in accordance with aspects of the invention concludes that the local-user 140 agrees with the prediction of EQ FOV 122A.

Figure 2C:
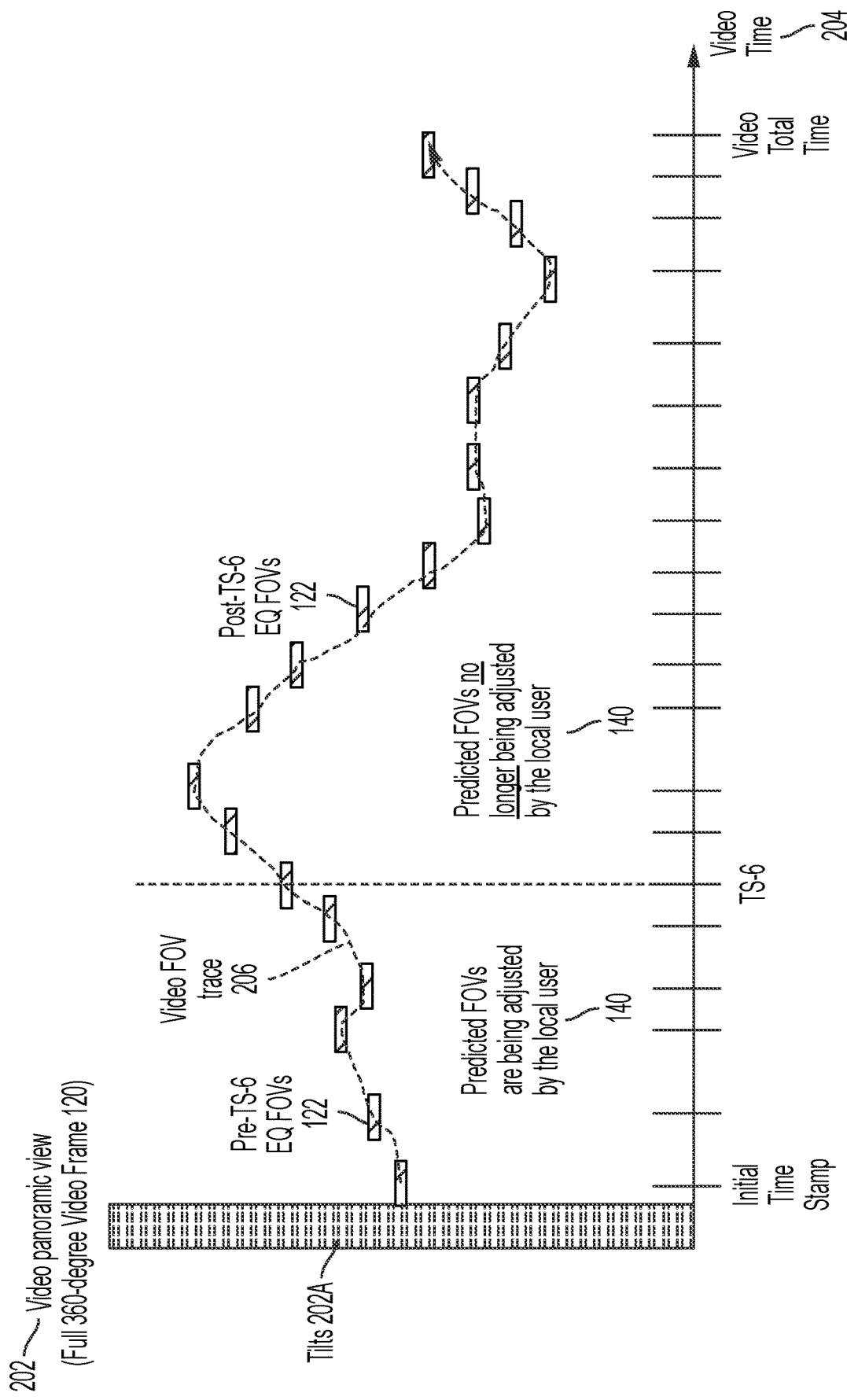
FIG. 2C depicts a graph illustrating a FOV trace generated for one user in accordance with embodiments of the invention.

FIG. 2C depicts a graph illustrating a FOV trace 200 generated by the computing system 110 for one local user 140 in accordance with embodiments of the invention. The y-axis of the graph shows multiple tilts 202A that make up a video panoramic view 202, which corresponds to multiple sequential instances of the full 360-degree video frame 120 (shown in FIGS. 1, 2A, and 2B). The x-axis of the graph show time stamps (TSs) that represent different times during a showing of the video panoramic view 202. The graph plots each EQ FOV 122 generated by the computer system 110 at each time stamp, and each EQ FOV 122 is coupled to the immediately preceding/following EQ FOV 122 by video FOV traces 206. In the example depicted in FIG. 2C, TS-6 divides the graph between a set of time periods where the predicted EQ FOVs 122 (pre-TS-6 EQ FOVs) are being adjusted by the local user 140 and a set of time periods where the predicted EQ FOVs 122 (Post-TS-6 EQ FOVs) are no longer being adjusted by the local user 140.

Figure 2D:
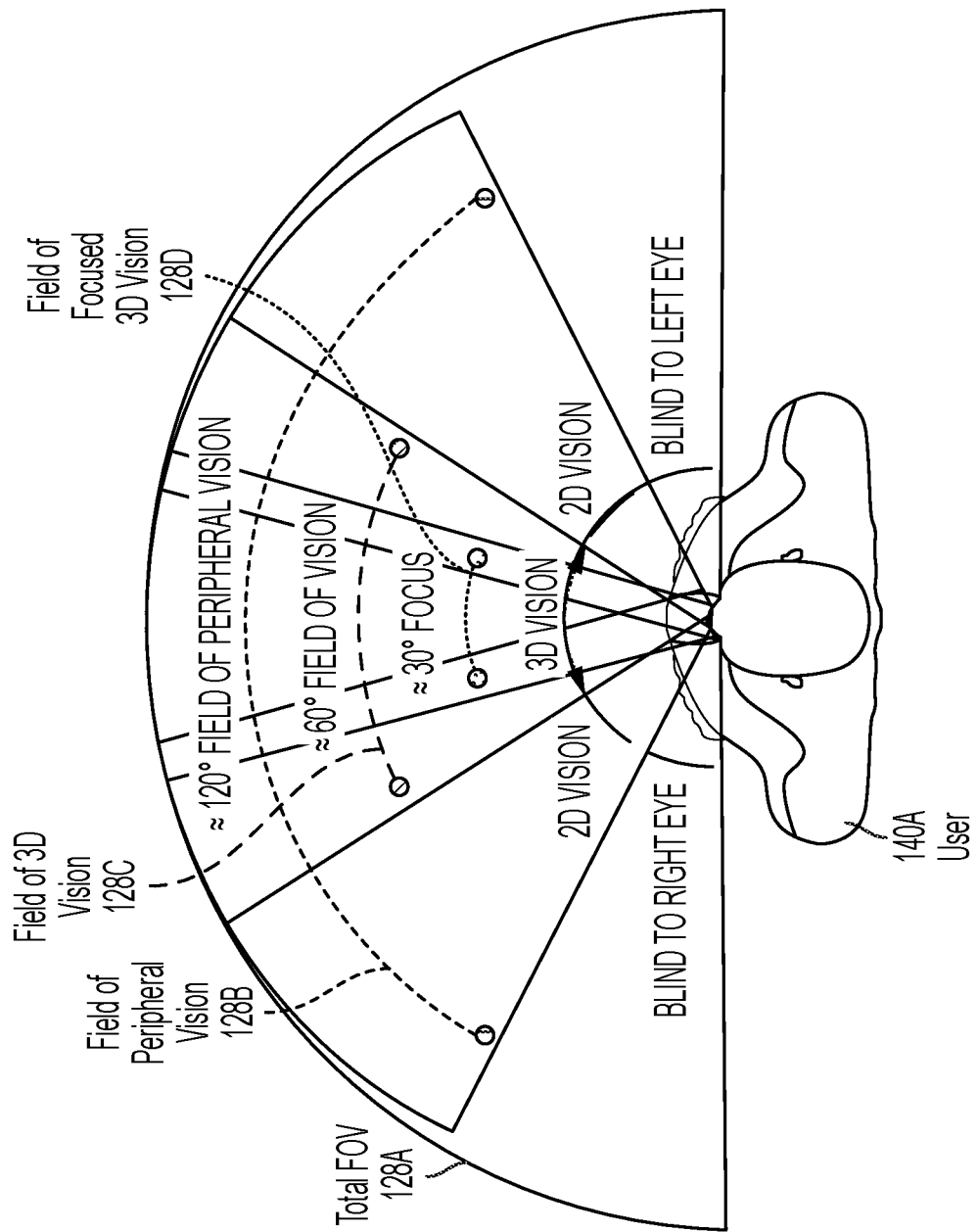
FIG. 2D depicts a top-down view of a human field-of-view (FOV) that illustrates concepts utilized in aspects of the invention.

FIG. 2D depicts a top-down view of a total FOV 128A of a user 140A that illustrates concepts utilized in aspects of the invention. In general, the total FOV 128A is the open observable area the user 140A can see through his or her eyes or via an optical device. A person's eyes are the natural start of perception of the total FOV 128A. The total FOV 128A is formed from multiple regions including a field of peripheral vision (FOPV) 128B; a field of 3D vision 128C; a field of focused 3D vision 128D; a leftmost field that is blind to the right eye; and a rightmost field that is blind to the left eye. In human vision, the field of 3D vision 128C is composed of two monocular FOVs, which the brain stitches together to form the field of 3D vision 128C as one binocular FOV. Individually, human eyes have a horizontal FOV of about 135 degrees and a vertical FOPV 128B of just over 180 degrees. The remaining 60-70 degrees of the total FOV 128A is devoted to the leftmost field that is blind to the right eye; and a rightmost field that is blind to the left eye. These regions are only monocular vision because only one eye can see those sections of the total FOV 128A. The measurements depicted in FIG. 2D are based on the total FOV 128A during steady fixation of the eyes of the user 140A.

In embodiments of the invention, the predicted, personalized, and enhanced quality FOV 122A, 122B, 122C, 122D generated by the computing system 110 can be implemented as the total FOV 128A or any of its subset regions including the FOPV 128B; the field of 3D vision 128C; the field of focused 3D vision 128D; the leftmost field that is blind to the right eye; and the rightmost field that is blind to the left eye. Additionally, as previously noted herein, the remote/online user behavior data can include the online users' selections of FOVs that will be displayed, and the online users' selections of FOVs that will be displayed can be the total FOV 128A or any of its subset regions including the FOPV 128B; the field of 3D vision 128C; the field of focused 3D vision 128D; the leftmost field that is blind to the right eye; and the rightmost field that is blind to the left eye. Embodiments of the invention can gather data about the nature and extent of the FOV of the user 140, 140A can be gathered by suitable eye tracking technologies configured and arranged to track eye movement and apply eye-tracking analytics that provide valuable insights into a user's attention while watching a video (including a 360-degree video), including for example what users are focused on; the details in the video that generate the biggest reaction; and what portions of the video elicit the most positive or negative user reactions. In some embodiments of the invention, a suitable eye tracking technology includes video-based eye-trackers in which a camera focuses on one or both eyes and records eye movement as the viewer looks at some kind of stimulus. An example eye-tracker uses the center of the pupil and infrared/near-infrared non-collimated light to create corneal reflections (CR). The vector between the pupil center and the corneal reflections can be used to compute the point of regard on surface or the gaze direction. A simple calibration procedure of the individual is usually needed before using the eye tracker. In embodiments of the invention, the computing system 110 can apply one or more bandwidth management technique (e.g., ABR) to the predicted FOV 122A (thereby generating an enhanced-quality FOV (EQ FOV) 122A), and the predicted FOV 122A can be implemented as the total FOV 128A or any of its subset regions including the FOPV 128B; the field of 3D vision 128C; the field of focused 3D vision 128D; the leftmost field that is blind to the right eye; and the rightmost field that is blind to the left eye.

Figure 3:
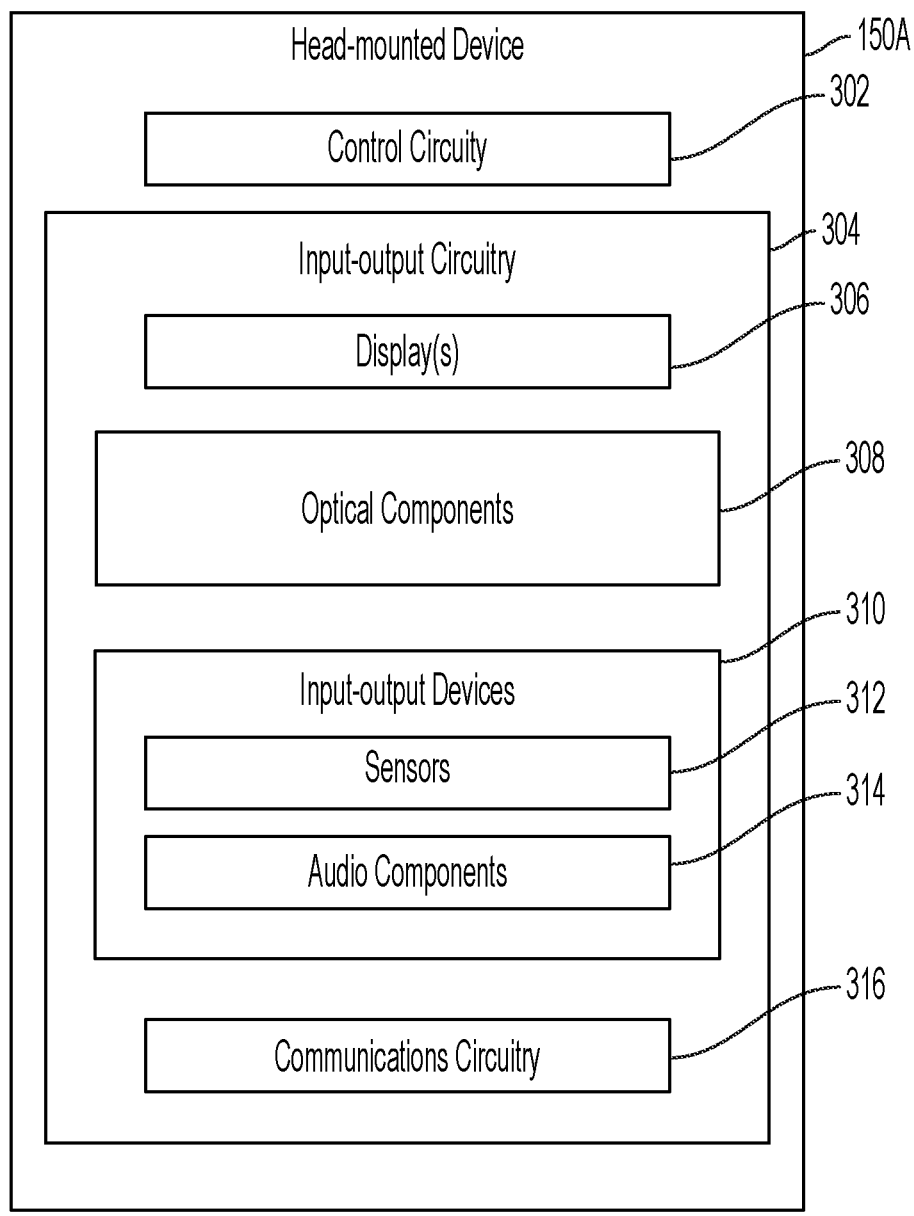
FIG. 3 depicts details of a head-mounted-device (HMD) according to embodiments of the invention.

FIG. 3 depicts an HMD 150A, which is a non-limiting example of how the HMD 150 (shown in FIG. 1) can be implemented. In accordance with aspects of the invention, the HMD 150A includes control circuitry 302 and input-output circuitry 304, configured and arranged as shown. The input-output circuitry 304 includes display(s) 306, optical components 308, input-output devices 310, and communications circuitry 318, configured and arranged as shown. The input-output devices 310 include sensors 312 and audio components 314, configured and arranged as shown. The various components of the HMD 150A can be supported by a head-mountable support structure such as a pair of glasses; a helmet; a pair of goggles; and/or other head-mountable support structure configurations.

In embodiments of the invention, the control circuitry 302 can include storage and processing circuitry for controlling the operation of the HMD 150A. The control circuitry 302 can include storage such as hard disk drive storage, non-volatile memory (e.g., electrically-programmable-read-only memory configured to form a solid state drive), volatile memory (e.g., static or dynamic random-access-memory), etc. Processing circuitry in the control circuitry 302 can be based on one or more microprocessors, microcontrollers, digital signal processors, baseband processors, power management units, audio chips, graphic processing units, application specific integrated circuits, and other integrated circuits. Computer program instructions can be stored on storage in the control circuitry 302 and run on processing circuitry in the control circuitry 302 to implement operations for HMD 150A (e.g., data gathering operations, operations involving the adjustment of components using control signals, image rendering operations to produce image content to be displayed for a user, etc.).

The input-output circuitry 304 can be used to allow the HMD 150A to receive data from external equipment (e.g., the computing system 110 (shown in FIG. 1); a portable device such as a handheld device; a laptop computer; or other electrical equipment) and to allow the user 140 (shown in FIG. 1) to provide the HMD 150A with user input. The input-output circuitry 304 can also be used to gather information on the environment in which HMD 150A is operating. Output components in the input-output circuitry 304 can allow the HMD 150A to provide the user 140 with output and can be used to communicate with external electrical equipment.

Display(s) 306 of the input-output circuitry 304 can be used to display images (e.g., the full 360-degree video frame 120 (shown in FIG. 1)) to the user 140 (shown in FIG. 1) of the HMD 150A. The display(s) 306 can be configured to have pixel array(s) to generate images that are presented to the user 140 through an optical system. The optical system can, if desired, have a transparent portion through which the user 140 (viewer) can observe real-world objects while computer-generated content is overlaid on top of the real-world objects by producing computer-generated images (e.g., the full 360-degree video frame 120) on the display(s) 306. In embodiments of the invention, the display(s) 306 are immersive views of the full 360-degree video frame 120, wherein the display(s) 306 place tiny screens and lenses close to the user's eyes to simulate large screens that encompass most of the user's field of view. As the user 140 performs actions like walking, head rotating (i.e., changing the point of view), data describing behavior of the user 140 (shown in FIG. 1) is fed to the computing system 110 (shown in FIG. 1) from the HMD 150A and/or the manipulation devices 152 (shown in FIG. 1).

The optical components 308 can be used in forming the optical system that presents images to the user 140. The optical components 308 can include static components such as waveguides, static optical couplers, and fixed lenses. The optical components 308 can also include adjustable optical components such as an adjustable polarizer, tunable lenses (e.g., liquid crystal tunable lenses; tunable lenses based on electro-optic materials; tunable liquid lenses; microelectromechanical systems (MLMS) tunable lenses; or other tunable lenses), a dynamically adjustable coupler, and other optical devices formed from electro-optical materials (e.g., lithium niobate or other materials exhibiting the electro-optic effect). The optical components 308 can be used in receiving and modifying light (images) from the display 306 and in providing images (e.g., the full 360-degree video frame 120) to the user 140 for viewing. In some embodiments of the invention, one or more of the optical components 308 can be stacked so that light passes through multiple of the components 308 in series. In embodiments of the invention, the optical components 308 can be spread out laterally (e.g., multiple displays can be arranged on a waveguide or set of waveguides using a tiled set of laterally adjacent couplers). In some embodiments of the invention, both tiling and stacking configurations are present.

The input-output devices 310 of the input-output circuitry 304 are configured to gather data and user input and for supplying the user 140 (shown in FIG. 1) with output. The input-output devices 310 can include sensors 312, audio components 314, and other components for gathering input from the user 140 and/or or the environment surrounding the HMD 150A and for providing output to the user 140. The input-output devices 310 can, for example, include keyboards; buttons; joysticks; touch sensors for trackpads and other touch sensitive input devices; cameras; light-emitting diodes; and/or other input-output components. For example, cameras or other devices in the input-output circuitry 304 can face the eyes of the user 140 and track the gaze of the user 140. The sensors 312 can include position and motion sensors, which can include, for example, compasses; gyroscopes; accelerometers and/or other devices for monitoring the location, orientation, and movement of the HDM 150A; and satellite navigation system circuitry such as Global Positioning System (GPS) circuitry for monitoring location of the user 140. The sensors 312 can further include eye-tracking functionality. Using the sensors 312, for example, the control circuitry 302 can monitor the current direction in which a user's head is oriented relative to the surrounding environment. Movements of the user's head (e.g., motion to the left and/or right to track on-screen objects and/or to view additional real-world objects) can also be monitored using the sensors 312.

In some embodiments of the invention, the sensors 312 can include ambient light sensors that measure ambient light intensity and/or ambient light color; force sensors; temperature sensors; touch sensors; capacitive proximity sensors; light-based proximity sensors; other types of proximity sensors; strain gauges; gas sensors; pressure sensors; moisture sensors; magnetic sensors; and the like. The audio components 314 can include microphones for gathering voice commands and other audio input and speakers for providing audio output (e.g., ear buds, bone conduction speakers, or other speakers for providing sound to the left and right ears of a user). In some embodiments of the invention, the input-output devices 310 can include haptic output devices (e.g., vibrating components); light-emitting diodes and other light sources; and other output components. The input-output circuitry 304 can include wired and/or wireless communications circuitry 316 that allows the HMD 150A (e.g., using the control circuitry 302) to communicate with external equipment (e.g., remote controls, joysticks, input controllers, portable electronic devices, computers, displays, and the like) and that allows signals to be conveyed between components (circuitry) at different locations in the HMD 150A.

Figure 4:
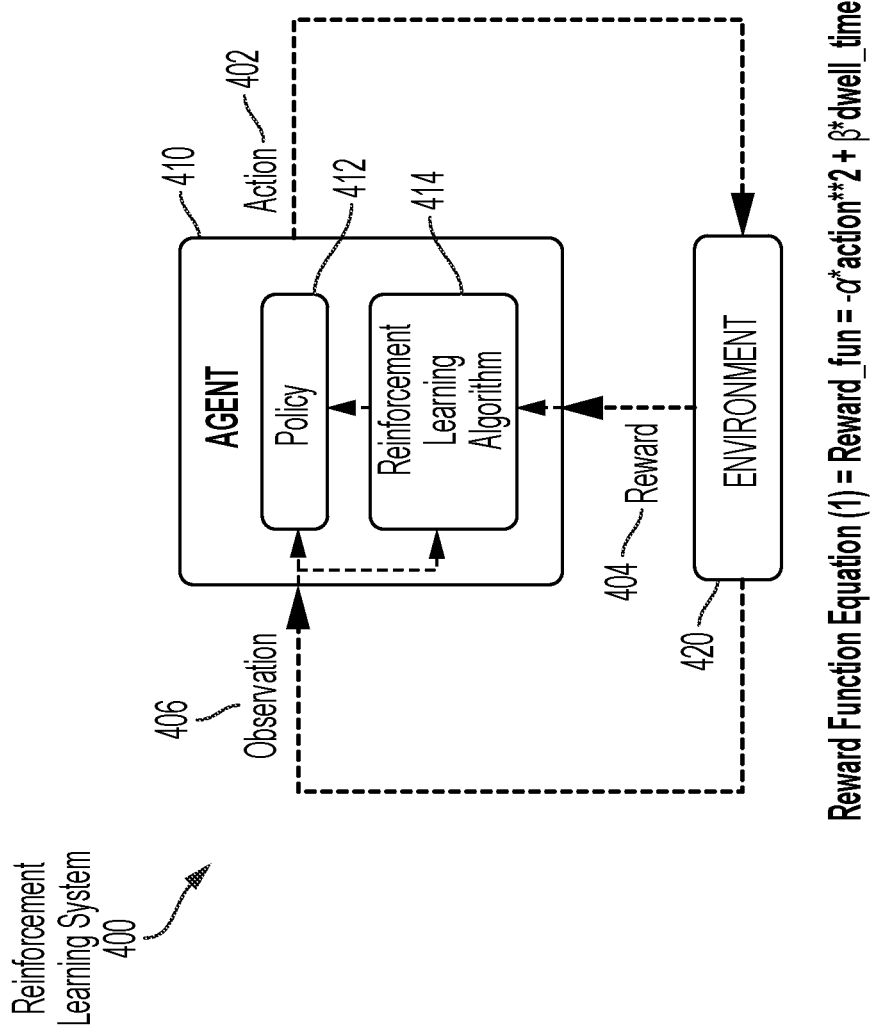
FIG. 4 depicts a combined block/flow diagram illustrating a reinforcement learning technique that can be used to implement aspects of the invention.

FIG. 4 depicts a combined block/flow diagram of a reinforcement learning system 400 that can be used to implement the coarse-grain FOV prediction technique trained to automatically make a coarse-grain prediction of the user's preferred next FOV by continuously generating lists of predicted user-preferred FOV candidates. The reinforcement learning system 400 includes an agent 410 configured and arranged to interact with an environment 420. The agent 410 includes a policy 412 (i.e., a mapping from states to (preferably optimal) actions) and a reinforcement algorithm 414.

The agent 410 receives observations (or states) 408 and reward signals 404 as inputs signals. The observation 408 indicate the current state of the environment 420, while the reward input signal 404 indicates a reward associated with a prior action of the agent 410 (e.g., for an immediately preceding action 402). Based on the observations/states 408 and the reward signals 404, the agent 410 chooses an action 402 (location of the displayed region 126), which is applied to the environment 420. Responsive to the action 402, a new observation/state 408 and reward 404 for the environment 420 are determined. The reinforcement learning algorithm 414 of the agent 410 seeks to learn values of observations/states 408 (or state histories) and tries to maximize utility of the outcomes. The values of observations/states 408 can be defined by the reward function equation (1) shown in FIG. 4. Thus, the reinforcement learning algorithm 414 constructs a model of the environment 420, wherein the model attempts to learn what operations are possible in each observation/state 408, and what observation/state 408 will result from performing an operation in a given state. The cycle repeats as the inputs 408, 404 are continuously provided to the agent 410.

The observations/states 408 can be defined as a signal conveying to the agent 410 some sense of "how the environment is" at a particular time. The observations/states 408 can be whatever information is available to the agent 410 about the environment 420. The observation/state signal 408 can be produced by any suitable preprocessing system (including sensors and sensor analysis circuitry) capable of evaluating the state of the environment 420.

The policy 412 defines how the learning agent 410 behaves at a given time. Roughly speaking, the policy 412 is a mapping from perceived observations/states 408 of the environment 420 to the actions 402 to be taken when in those states. In some cases the policy 412 can be a simple function or lookup table, whereas in other cases it can involve extensive computation such as a search process. The policy 412 is the core of a reinforcement learning agent 410 in the sense that it alone is sufficient to determine behavior. In general, the policy 412 can be stochastic.

The reward signal 404 defines the goal in the reinforcement learning problem (i.e., continuously generating lists of predicted user-preferred FOV candidates). On each time step, the environment 420 sends to the reinforcement learning agent 410 the reward signal 404. The objective of the agent 410 is to maximize the total reward 404 it receives over the long run. The reward signal 404 thus defines what are good and bad events for the agent 410. The reward signal 404 is the primary basis for altering the policy 412. If an action 402 selected by the policy 412 is followed by low reward 404, the policy 412 may be changed to select some other action 402 in that situation in the future. In general, the reward signal 404 can be stochastic functions of the state of the environment 420 and the actions 402 that were taken.

Whereas the reward signal 404 indicates what is good in an immediate sense, the reward function (shown in FIG. 4 as the reward function equation (1)) specifies what is good (or valuable) in the long run. The reward function equation (1) provides an estimate the value of associated with the inputs 408, 404 and is executed by the reinforcement learning algorithm 414 of the agent 410. Roughly speaking, the value of an observation/state 408 is the total amount of reward 404 the agent 410 can expect to accumulate over the future, starting from that observation/state 408. Accordingly, the reward signal 404 determines the immediate, intrinsic desirability of environmental observations/states 408, values (defined by the reward function) indicate the long-term desirability of observations/states 408 after taking into account the observations/states that are likely to follow, and the rewards 404 available in those observations/states 408. For example, an observation/state 408 might always yield a low immediate reward 404 but still have a high value because it is regularly followed by other observations/states 408 that yield high rewards 404. The actions 402 are chosen based on value judgments. The agent 410 seeks actions 402 that bring about observations/states 408 of highest value (as measured by the reward function) not the highest reward signal 404 because such actions 402 obtain the greatest amount of reward signals 404 over the long run. The reward signals 404 are essentially given directly by the environment 420, but values (as defined by the reward function) must be estimated and re-estimated from the sequences of observations/states 408 the agent 410 makes over its entire lifetime.

Reinforcement learning performed by the system 400 is different from supervised machine learning. Supervised machine learning is learning from a training set of labeled examples provided by a knowledgeable external supervisor. Each example is a description of a situation together with a specification—the label—of the correct action the system should take to that situation, which is often to identify a category to which the situation belongs. The object of this kind of machine learning is for the system to extrapolate, or generalize, its responses so that it acts correctly in situations not present in the training set. Supervised machine learning alone is not adequate for learning from interaction. In interactive problems it is often impractical to obtain examples of desired behavior that are both correct and representative of all the situations in which the agent has to act. In uncharted territory, which is where learning is expected to be most beneficial, an agent must be able to learn from its own experience.

Reinforcement learning is also different from unsupervised machine learning, which is typically attempting to find structure hidden in collections of unlabeled data. The terms supervised machine learning and unsupervised machine learning would seem to exhaustively classify machine learning paradigms, but they do not. Although both reinforcement learning and unsupervised learning do not rely on examples of correct behavior, they differ in that reinforcement learning is attempting to maximize a reward signal instead of attempting to find hidden structure. Uncovering structure in an agent's experience can be useful in reinforcement learning but by itself does not address the reinforcement learning problem of maximizing a reward signal. Accordingly, it is appropriate to consider reinforcement learning to be a third machine learning paradigm, alongside supervised learning and unsupervised learning.

Figure 5:
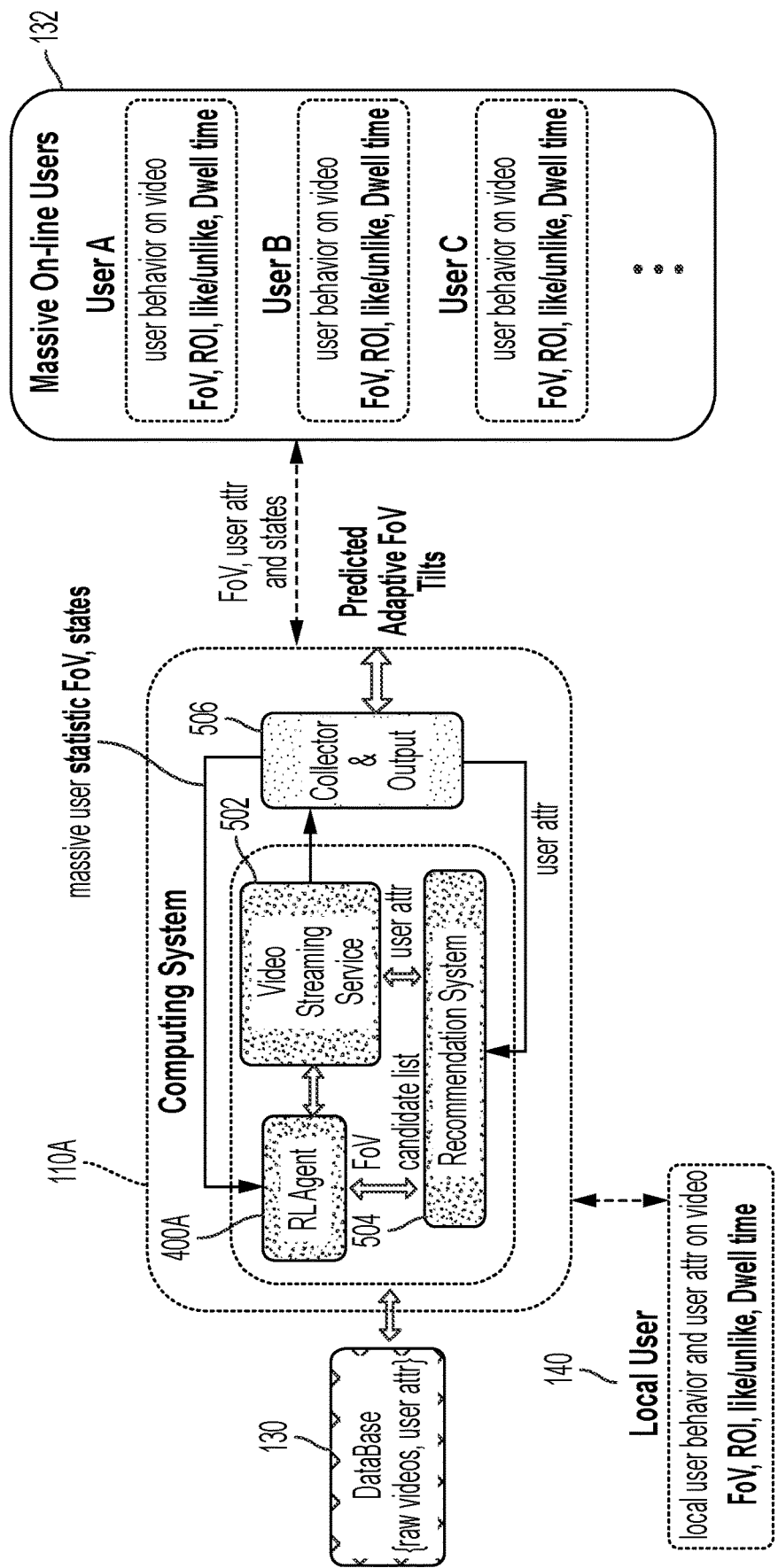
FIG. 5 depicts a block diagram illustrating a system according to embodiments of the invention.
Figure 6:
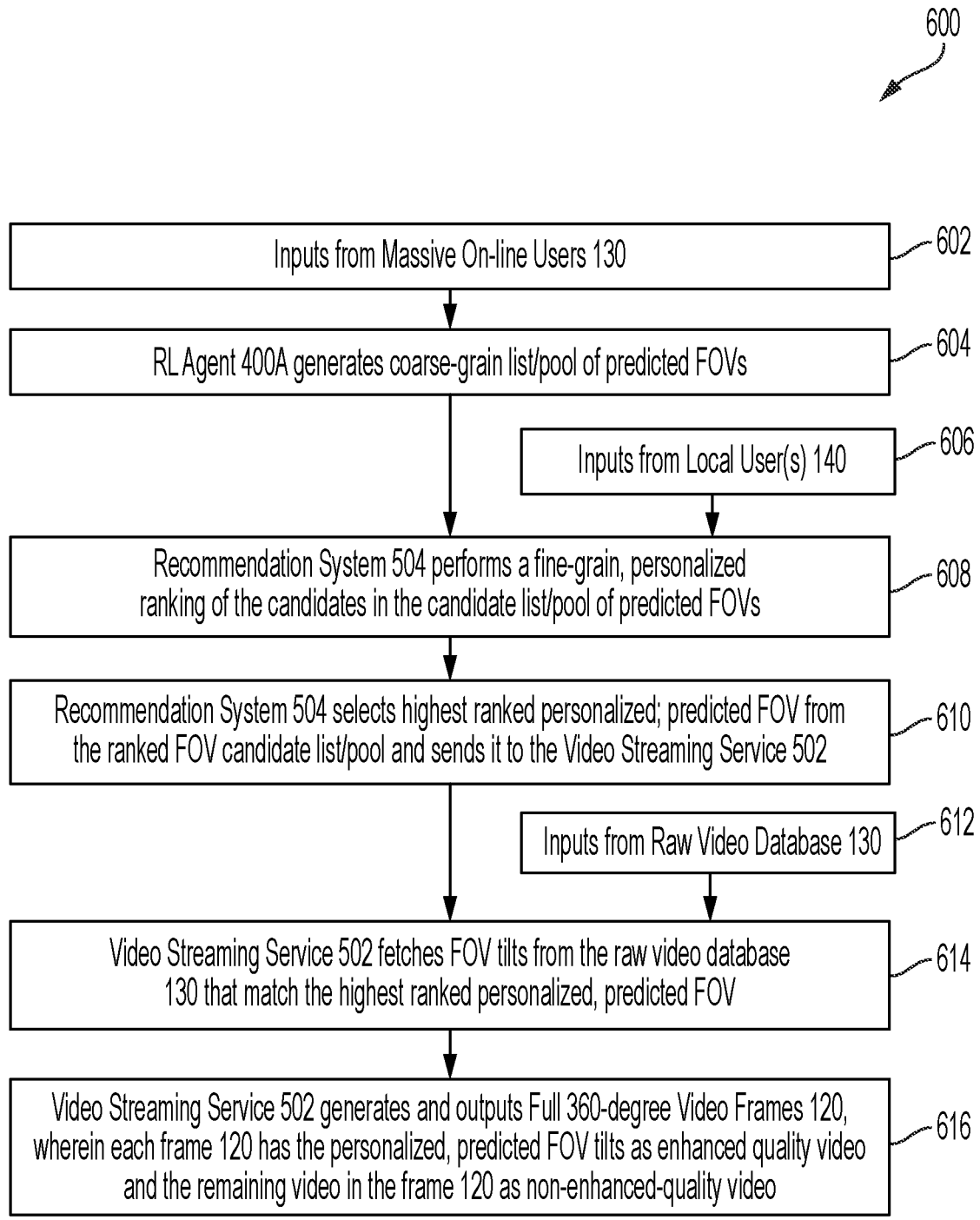
FIG. 6 depicts a flow diagram illustrating a computer-implemented methodology in accordance embodiments of the invention.

FIG. 5 depicts a block diagram illustrating an example of how the computing system 110 (shown in FIG. 1) can be implemented as a computing system 110A, and FIG. 6 depicts a flow diagram illustrating a computer-implemented method 600 that can be executed by the computing system 110A in accordance embodiments of the invention. The following description of the computing system 110A will reference the computer system 110 shown in FIG. 5, as well as corresponding operations of the computer-implemented method 600 shown in FIG. 6. As shown in FIG. 5, the computing system 110A can include a reinforcement learning (RL) agent 400A, a video streaming service 502, a recommendation system 504, and a collector & output system 506, configured and arranged as shown. The computing system 110A receives inputs from the online users 132 (block 602), local user(s) 140 (block 606), and the raw video database 130 (block 612).

In embodiments of the invention, the computing system 110A performs the task of predicting the preferred FOV 122A of the user 140 by using the RL agent 400A as the previously-described coarse-grain FOV prediction technique, and by using the recommendation system 504 as the previously-described fine-grain and personalized FOV prediction technique. In embodiments of the invention, the coarse-grain RL agent 400A can include the features and functionality of the reinforcement learning system 400 (shown in FIG. 4), which are used to generate the previously-described list of user-preferred next FOV candidates (block 604) based on the previously-described remote or online video state data and the previously-described remote or online user behavior data received from the massive (i.e., very large number of) online users 132 while they are actively watching video. The term massive is used to indicate that the predictions generated by the system 100 are improved as total number of users increases. However, if only one or a few users use the system 100, the system 100 will adapt to the one or few users.

In embodiments of the invention, the fine-grain FOV prediction technique executed by the recommendation system 504 ranks the list of preferred next FOV candidates (block 608) based on local users' attribute data (i.e., "local-user attribute data") and local users' behavior data (i.e., "local-user behavior data"), which are gathered from one or more local users 140 as they use the system 100 to locally watch a video. The fine-grain FOV prediction technique outputs the highest ranked FOV candidate as the preferred/predicted next FOV (block 610). In embodiments of the invention, the recommendation system 504 can be implemented as machine learning algorithm (or model) trained to perform the task of dynamically and adaptively ranking the list of preferred next FOV candidates based on the local-user attribute data and the local-user behavior data. The overall system 100, and more specifically the recommendation system 504, is dynamically adaptable in that it is responsive to changes in the local-user behavior data. For example, if a predicted displayed-FOV is not suitable to the local-user 140, the local-user 140 will make adjustments to the predicted displayed-FOV, and the recommendation system 504 will take these adjustments into account for the next predicted displayed-FOV by updating the training of its machine learning algorithm/model (e.g., by setting higher ranking weights for the most recently received local-user adjustments). Multiple iterations of this process of local-user adjustments followed by corresponding model updates are executed until the recommendation system 504 has adapted to the new preferences of the local-user 140, and the local-user 140 is no longer making local-user adjustments to the predicted displayed-FOV, thereby improving the local-user's QoE. The control & output system 506 processes all input/output data of the computing system 110A. To reduce the likelihood of bandwidth-based streaming delays and/or resolution degradation that can further reduce QoE, the video streaming service module 502 fetches the predicted displayed-FOV from the raw video database 130 (block 614) and applies one or more bandwidth management technique (e.g., adaptive bit rate (ABR)) to the predicted displayed-FOV, while allowing the portion of the video frame that is outside the predicted displayed-FOV to be transmitted with a minimized or reduced video quality (block 616).

Figure 7:
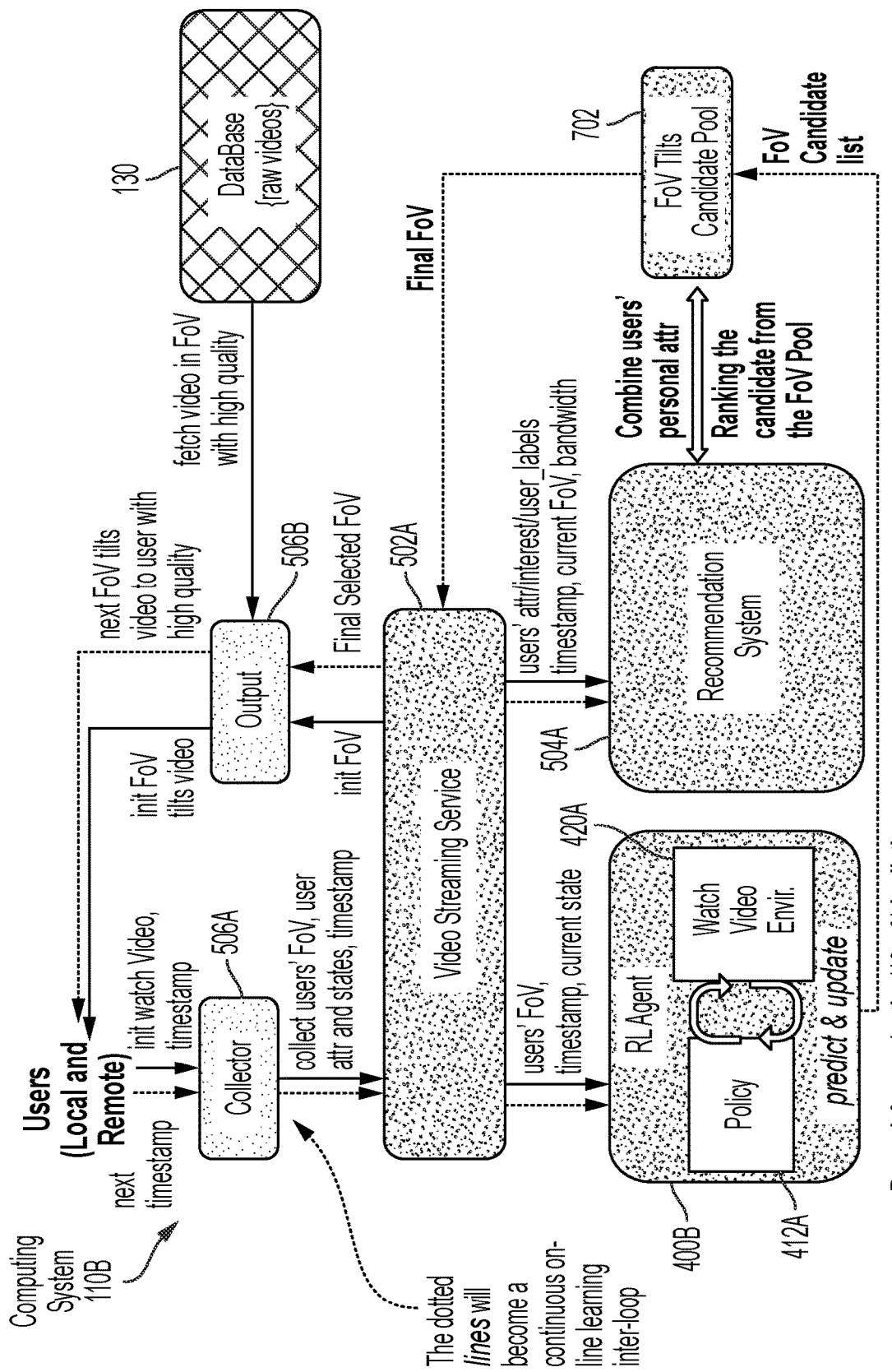
FIG. 7 depicts a combination flow diagram and block diagram illustrating operations of a system according to embodiments of the invention.
Figure 8A:
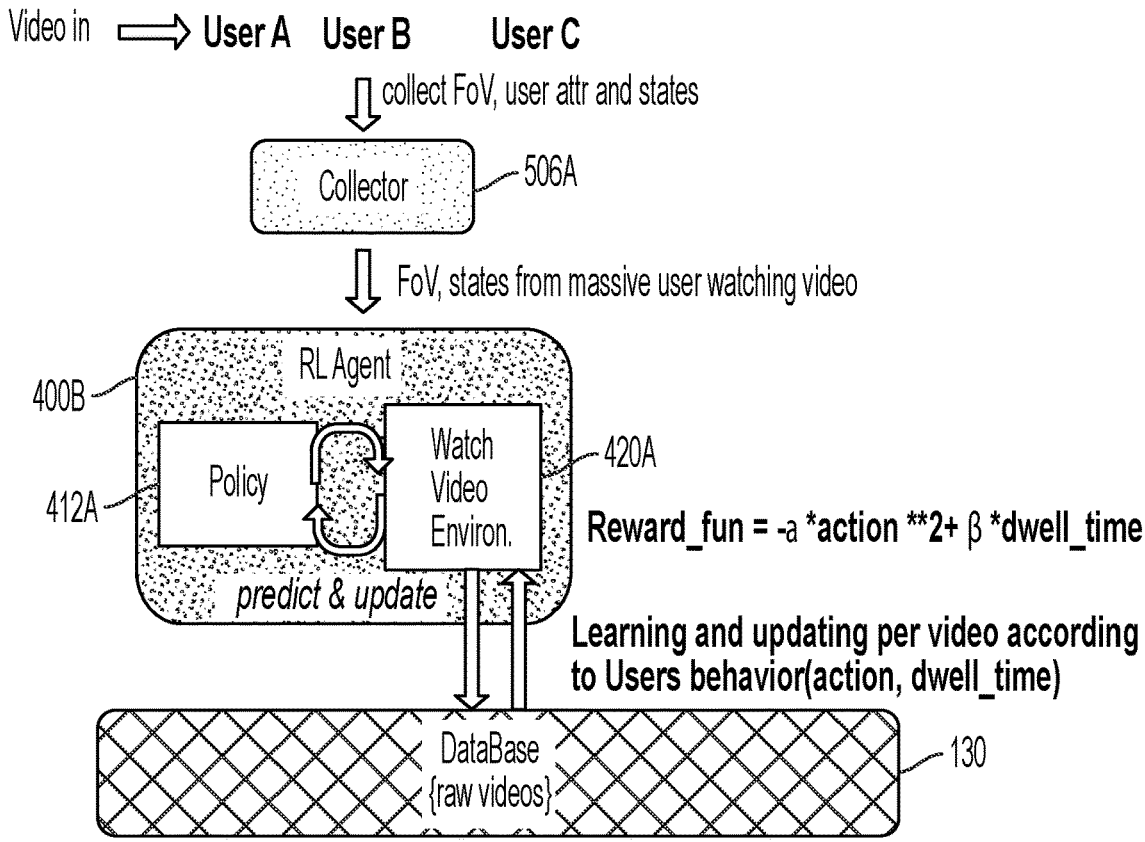
FIG. 8A depicts a block diagram illustrating a system in accordance with aspects of the invention.
Figure 8B:
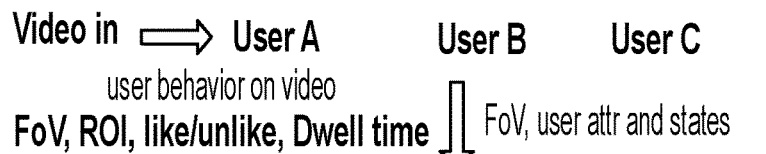
FIG. 8B depicts a block diagram illustrating a system in accordance with aspects of the invention.

FIG. 7 depicts a combination flow/block diagram illustrating another example of how the computing system 110 (shown in FIG. 1) can be implemented as a computing system 110B according to embodiments of the invention. The computing system 110B includes a collector 506A, an output 506B, a video streaming service 502A, an RL agent 400A, a recommendation system 504A, and a FOV candidate pool module 702, configured and arranged as shown. The input collector 506A and the output 506B correspond in operation to the collector & output module 506; the RL agent 400B corresponds in operation to the RL agent 400A; the policy 412A corresponds in operation to the policy 412; and the recommendation system 504A corresponds in operation to the recommendation system 504. The dotted line directional arrows that connect the modules 506A, 502A, 400B, 504A, 702, and 506B represent the previously-described coarse-grain and fine-grain techniques that run as a continuous on-line learning inter-loop. The solid line directional arrows represent the operations of the computing system 110B that correspond to an initial time when a local user (e.g., local user 140) is watching video and the computing system 110B has not yet developed personalized information about the local user.

Figure 9:
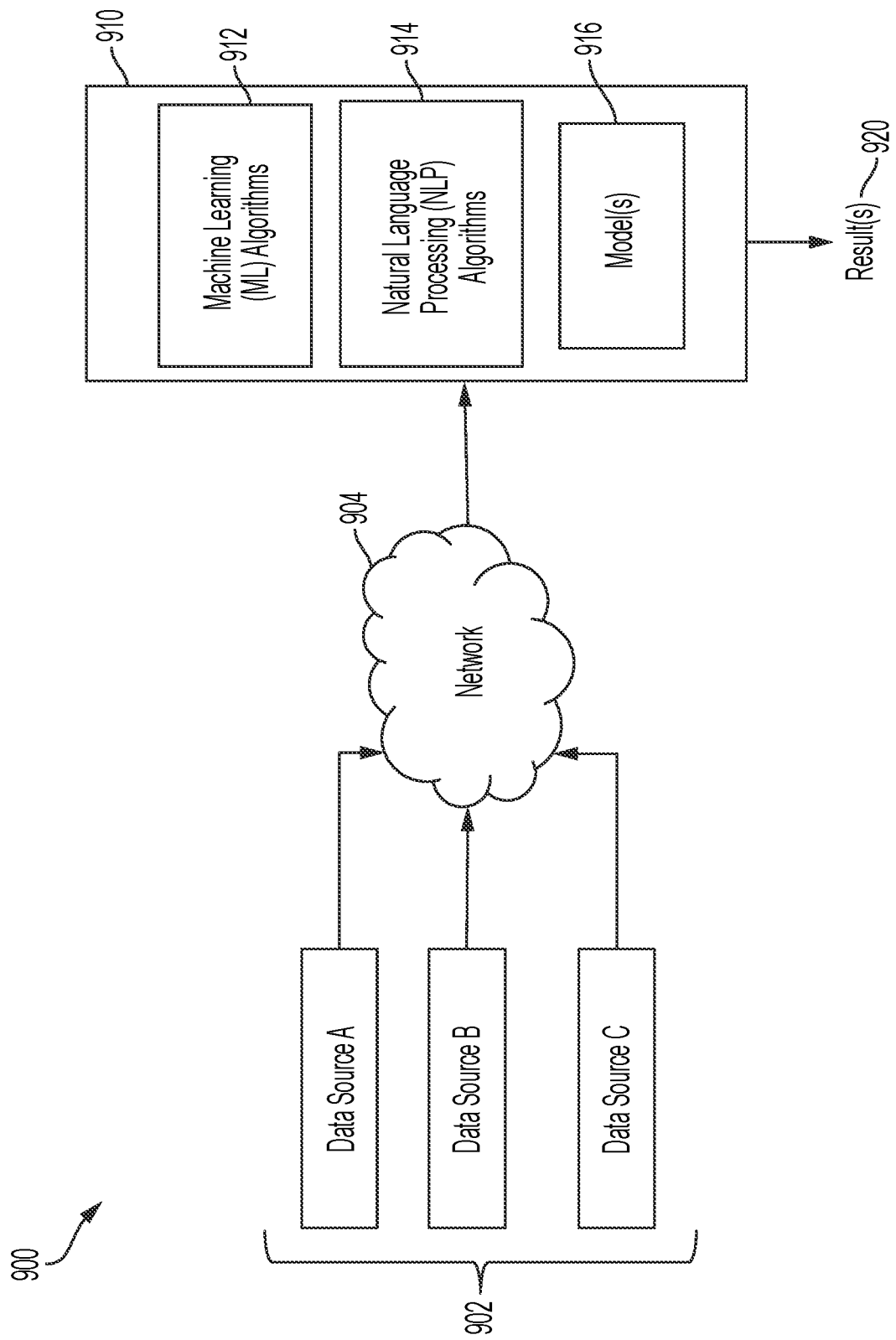
FIG. 9 depicts a machine learning system that can be utilized to implement aspects of the invention.

FIG. 9 depicts a combination flow/block diagram illustrating additional details of how the computing system 110 uses the RL agent 400B to collect massive user behaviors on various videos in order to train the RL agent 400B to perform the previously-described coarse grain the coarse-grain FOV prediction technique, wherein the RL agent 400B is trained to automatically make a coarse-grain prediction of the user's preferred next FOV by generating a list of user-preferred next FOV candidates based on remote or online video state data and remote or online user behavior data received from a large number of remote or online users while they are actively watching video. In practice, the RL agent 400B can be switched to a serving mode that only makes predictions, and can be switched back to a learning mode for mode for updating the RL agent 400B.

The dotted-line directional arrows show the implementation of a continuous on-line learning inter-loop by the computing system 110B. At every round, the video streaming service system 502A will collect users' FOV states, attribute and timestamps. Then the system 502A provides users' FOV, timestamp, current state to the RL agent 400B, which will switch to learning mode first to update itself then switch back to serving mode to gives out coarse FOV candidates lists. The system 502A then inputs users' attributes, interests, labels, timestamp, current FOV, and bandwidth information to the recommendation system 504A. The recommendation system 504A will operate on the FOV candidates list to rank all candidates. The computing system 110B then fetches out the high (or enhanced) quality videos from database 130 using the highest ranked FOV results and output it to the users. The solid-line directional arrows show the first round operation when the video streaming service system 502A is initialized. For the first round, there is no update on RL agent 400B because the reward function needs feedback from the environment 420A, and from the user action on the predicted results. After the first round, the continuous on-line learning can start as shown by the dotted line directional arrows.

At its learning mode, the RL agent 400B will update its parameters by its policy 412A (e.g., a deep determined gradient policy (DDGP)). The policy 412A is the algorithm to minimize reward (e.g., reward 404 shown in FIG. 4) that is calculated from current state and the action. In embodiments of the invention, the reward can be modeled as a reward_function=$-\alpha$*action**2+$\beta$*dwell_time; where $\alpha$ and $\beta$ are positive scaler coefficients; "action" is the absolute difference between predicted FOV and users changes to FOV measured in distance; dwell_time is how long users stay in a current FOV. To maximize the reward_function means to have minimal FOV change action and maximum dwell_time of RL predicted FOV results.

Figure 10:
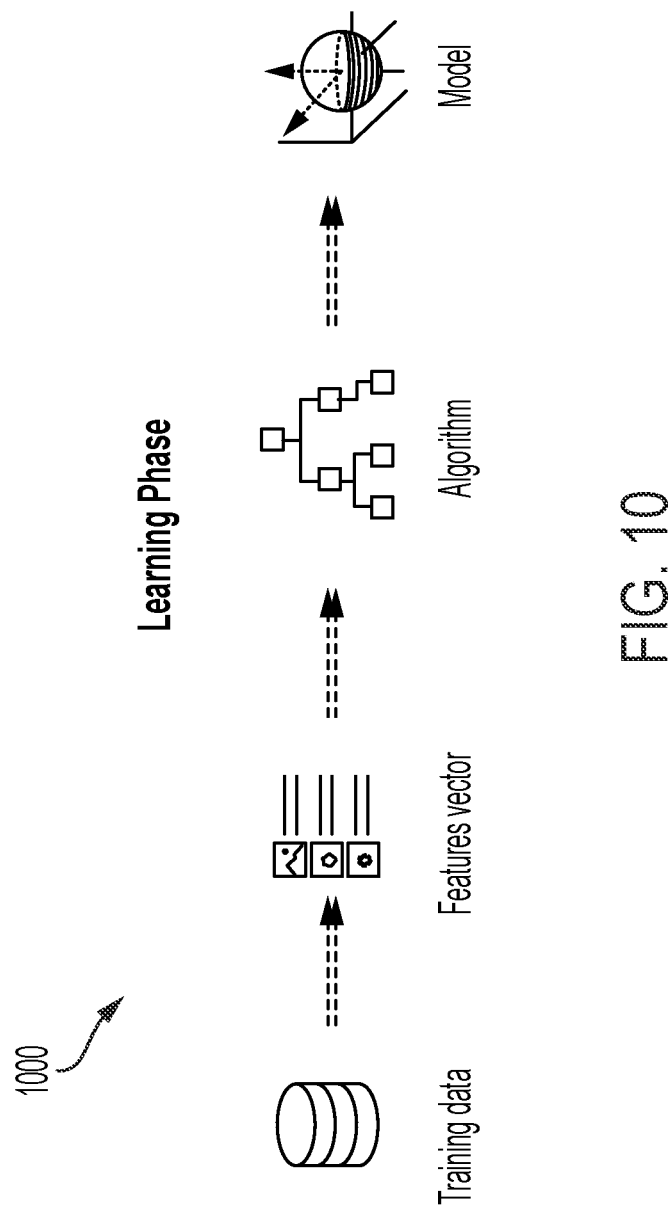
FIG. 10 depicts a learning phase that can be implemented by the machine learning system shown in FIG. 9.

FIG. 10 depicts a combination flow/block diagram illustrating additional details of how the computing system 110 uses the recommendation system 504A to collect local user behaviors, local user unique preferences, and local user attributes in connection with the local user viewing various videos in order to train the recommendation system 504A to perform the previously-described fine-grain FOV prediction technique. The recommendation system 504A is trained to automatically make the fine-grain FOV prediction technique by ranking the list of preferred next FOV candidates based on local users' attribute data (i.e., "local-user attribute data") and local users' behavior data (i.e., "local-user behavior data"), which are gathered from one or more local users as they use the system 100 to locally watch a video. The fine-grain FOV prediction technique outputs the highest ranked FOV candidate as the preferred/predicted next FOV. In embodiments of the invention, the local-user behavior data can be substantially the same as the remote/online user behavior data, and the local-user attribute data can include metadata collected from local users who use the system to watch video. The collected metadata can be information relating to explicit interactions between local user 140 and the system 100, including for example information about the local user's past activity, the local user's ratings, reviews and other information about the local user's profile, such as or viewing preferences. These explicit interactions can be combined with implicit interactions such as the device used for access, clicks on a link, location, and dates.

An example of machine learning techniques that can be used to implement aspects of the invention will be described with reference to FIGS. 9 and 10. Machine learning models configured and arranged according to embodiments of the invention will be described with reference to FIG. 9. Detailed descriptions of an example computing system and network architecture capable of implementing one or more of the embodiments of the invention described herein will be provided with reference to FIG. 11.

FIG. 9 depicts a block diagram showing a machine learning or classifier system 900 capable of implementing various aspects of the invention described herein. More specifically, the functionality of the system 900 is used in embodiments of the invention to generate various models and sub-models that can be used to implement computer functionality in embodiments of the invention. The system 900 includes multiple data sources 902 in communication through a network 904 with a classifier 910. In some aspects of the invention, the data sources 902 can bypass the network 904 and feed directly into the classifier 910. The data sources 902 provide data/information inputs that will be evaluated by the classifier 910 in accordance with embodiments of the invention. The data sources 902 also provide data/information inputs that can be used by the classifier 910 to train and/or update model(s) 916 created by the classifier 910. The data sources 902 can be implemented as a wide variety of data sources, including but not limited to, sensors configured to gather real time data, data repositories (including training data repositories), and outputs from other classifiers. The network 904 can be any type of communications network, including but not limited to local networks, wide area networks, private networks, the Internet, and the like.

Figure 11:
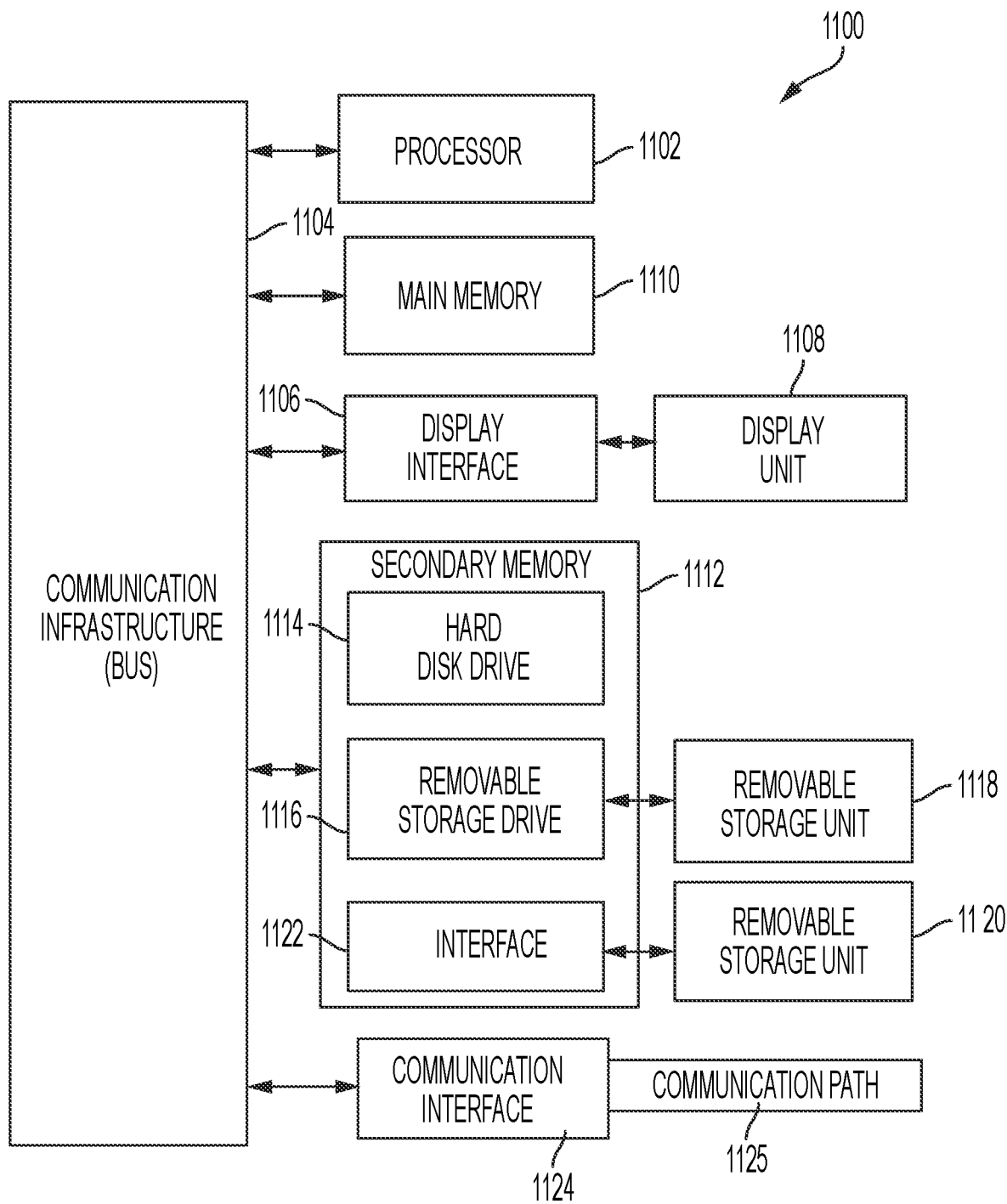
FIG. 11 depicts details of an exemplary computing system capable of implementing various aspects of the invention.

The classifier 910 can be implemented as algorithms executed by a programmable computer such as a processing system 1100 (shown in FIG. 11). As shown in FIG. 9, the classifier 910 includes a suite of machine learning (ML) algorithms 912; natural language processing (NLP) algorithms 914; and model(s) 916 that are relationship (or prediction) algorithms generated (or learned) by the ML algorithms 912. The algorithms 912, 914, 916 of the classifier 910 are depicted separately for ease of illustration and explanation. In embodiments of the invention, the functions performed by the various algorithms 912, 914, 916 of the classifier 910 can be distributed differently than shown. For example, where the classifier 910 is configured to perform an overall task having sub-tasks, the suite of ML algorithms 912 can be segmented such that a portion of the ML algorithms 912 executes each sub-task and a portion of the ML algorithms 912 executes the overall task. Additionally, in some embodiments of the invention, the NLP algorithms 914 can be integrated within the ML algorithms 912.

The NLP algorithms 914 include speech recognition functionality that allows the classifier 910, and more specifically the ML algorithms 912, to receive natural language data (text and audio) and apply elements of language processing, information retrieval, and machine learning to derive meaning from the natural language inputs and potentially take action based on the derived meaning. The NLP algorithms 914 used in accordance with aspects of the invention can also include speech synthesis functionality that allows the classifier 910 to translate the result(s) 920 into natural language (text and audio) to communicate aspects of the result(s) 920 as natural language communications.

The NLP and ML algorithms 914, 912 receive and evaluate input data (i.e., training data and data-under-analysis) from the data sources 902. The ML algorithms 912 includes functionality that is necessary to interpret and utilize the input data's format. For example, where the data sources 902 include image data, the ML algorithms 912 can include visual recognition software configured to interpret image data. The ML algorithms 912 apply machine learning techniques to received training data (e.g., data received from one or more of the data sources 902) in order to, over time, create/train/update one or more models 916 that model the overall task and the sub-tasks that the classifier 910 is designed to complete.

Referring now to FIGS. 9 and 10 collectively, FIG. 10 depicts an example of a learning phase 1000 performed by the ML algorithms 912 to generate the above-described models 916. In the learning phase 1000, the classifier 910 extracts features from the training data and coverts the features to vector representations that can be recognized and analyzed by the ML algorithms 912. The features vectors are analyzed by the ML algorithm 912 to "classify" the training data against the target model (or the model's task) and uncover relationships between and among the classified training data. Examples of suitable implementations of the ML algorithms 912 include but are not limited to neural networks, support vector machines (SVMs), logistic regression, decision trees, hidden Markov Models (HMIs), etc. The learning or training performed by the ML algorithms 912 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 910 and the ML algorithms 912. Unsupervised learning can utilize additional learning/training methods including, for example, clustering, anomaly detection, neural networks, deep learning, and the like.

When the models 916 are sufficiently trained by the ML algorithms 912, the data sources 902 that generate "real world" data are accessed, and the "real world" data is applied to the models 916 to generate usable versions of the results 920. In some embodiments of the invention, the results 920 can be fed back to the classifier 910 and used by the ML algorithms 912 as additional training data for updating and/or refining the models 916.

In aspects of the invention, the ML algorithms 912 and the models 916 can be configured to apply confidence levels (CLs) to various ones of their results/determinations (including the results 920) in order to improve the overall accuracy of the particular result/determination. When the ML algorithms 912 and/or the models 916 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 910 can be configured to apply confidence levels (CLs) to the results 920. When the classifier 910 determines that a CL in the results 920 is below a predetermined threshold (TH) (i.e., CL<TH), the results 920 can be classified as sufficiently low to justify a classification of "no confidence" in the results 920. If CL>TH, the results 920 can be classified as sufficiently high to justify a determination that the results 920 are valid. Many different predetermined TH levels can be provided such that the results 920 with CL>TH can be ranked from the highest CL>TH to the lowest CL>TH.

The functions performed by the classifier 910, and more specifically by the ML algorithm 912, can be organized as a weighted directed graph, wherein the nodes are artificial neurons (e.g. modeled after neurons of the human brain), and wherein weighted directed edges connect the nodes. The directed graph of the classifier 910 can be organized such that certain nodes form input layer nodes, certain nodes form hidden layer nodes, and certain nodes form output layer nodes. The input layer nodes couple to the hidden layer nodes, which couple to the output layer nodes. Each node is connected to every node in the adjacent layer by connection pathways, which can be depicted as directional arrows that each has a connection strength. Multiple input layers, multiple hidden layers, and multiple output layers can be provided. When multiple hidden layers are provided, the classifier 910 can perform unsupervised deep-learning for executing the assigned task(s) of the classifier 910.

Similar to the functionality of a human brain, each input layer node receives inputs with no connection strength adjustments and no node summations. Each hidden layer node receives its inputs from all input layer nodes according to the connection strengths associated with the relevant connection pathways. A similar connection strength multiplication and node summation is performed for the hidden layer nodes and the output layer nodes.

The weighted directed graph of the classifier 910 processes data records (e.g., outputs from the data sources 902) one at a time, and it "learns" by comparing an initially arbitrary classification of the record with the known actual classification of the record. Using a training methodology knows as "back-propagation" (i.e., "backward propagation of errors"), the errors from the initial classification of the first record are fed back into the weighted directed graphs of the classifier 910 and used to modify the weighted directed graph's weighted connections the second time around, and this feedback process continues for many iterations. In the training phase of a weighted directed graph of the classifier 910, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the weighted directed graph's calculated values for the output nodes to these "correct" values, and to calculate an error term for each node (i.e., the "delta" rule). These error terms are then used to adjust the weights in the hidden layers so that in the next iteration the output values will be closer to the "correct" values.

FIG. 11 depicts a high level block diagram of the computer system 1100, which can be used to implement one or more computer processing operations in accordance with aspects of the present invention. Although one exemplary computer system 1100 is shown, computer system 1100 includes a communication path 1125, which connects computer system 1100 to additional systems (not depicted) and can include one or more wide area networks (WANs) and/or local area networks (LANs) such as the Internet, intranet(s), and/or wireless communication network(s). Computer system 1100 and the additional systems are in communication via communication path 1125, e.g., to communicate data between them.

Computer system 1100 includes one or more processors, such as processor 1102. Processor 1102 is connected to a communication infrastructure 1104 (e.g., a communications bus, cross-over bar, or network). Computer system 1100 can include a display interface 1106 that forwards graphics, text, and other data from communication infrastructure 1104 (or from a frame buffer not shown) for display on a display unit 1108. Computer system 1100 also includes a main memory 1110, preferably random access memory (RAM), and can also include a secondary memory 1112. Secondary memory 1112 can include, for example, a hard disk drive 1114 and/or a removable storage drive 1116, representing, for example, a floppy disk drive, a magnetic tape drive, or an optical disk drive. Removable storage drive 1116 reads from and/or writes to a removable storage unit 1118 in a manner well known to those having ordinary skill in the art. Removable storage unit 1118 represents, for example, a floppy disk, a compact disc, a magnetic tape, or an optical disk, flash drive, solid state memory, etc. which is read by and written to by removable storage drive 1116. As will be appreciated, removable storage unit 1118 includes a computer readable medium having stored therein computer software and/or data.

In alternative embodiments of the invention, secondary memory 1112 can include other similar means for allowing computer programs or other instructions to be loaded into the computer system. Such means can include, for example, a removable storage unit 1120 and an interface 1122. Examples of such means can include a program package and package interface (such as that found in video game devices), a removable memory chip (such as an EPROM, or PROM) and associated socket, and other removable storage units 1120 and interfaces 1122 which allow software and data to be transferred from the removable storage unit 1120 to computer system 1100.

Computer system 1100 can also include a communications interface 1124. Communications interface 1124 allows software and data to be transferred between the computer system and external devices. Examples of communications interface 1124 can include a modem, a network interface (such as an Ethernet card), a communications port, or a PCM-CIA slot and card, etcetera. Software and data transferred via communications interface 1124 are in the form of signals which can be, for example, electronic, electromagnetic, optical, or other signals capable of being received by communications interface 1124. These signals are provided to communications interface 1124 via communication path (i.e., channel) 1125. Communication path 1125 carries signals and can be implemented using wire or cable, fiber optics, a phone line, a cellular phone link, an RF link, and/or other communications channels.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
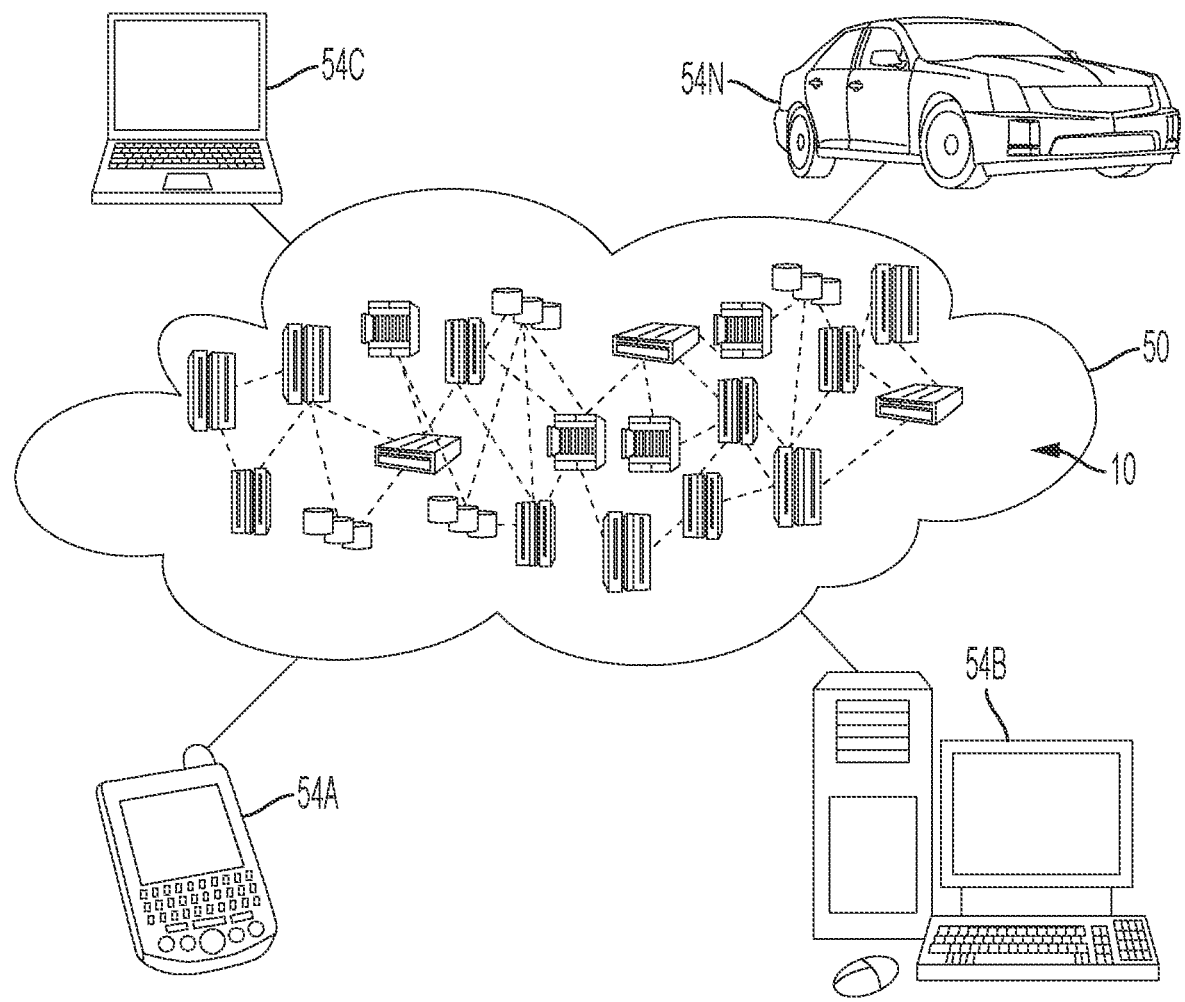
FIG. 12 depicts a cloud computing environment according to embodiments of the invention.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
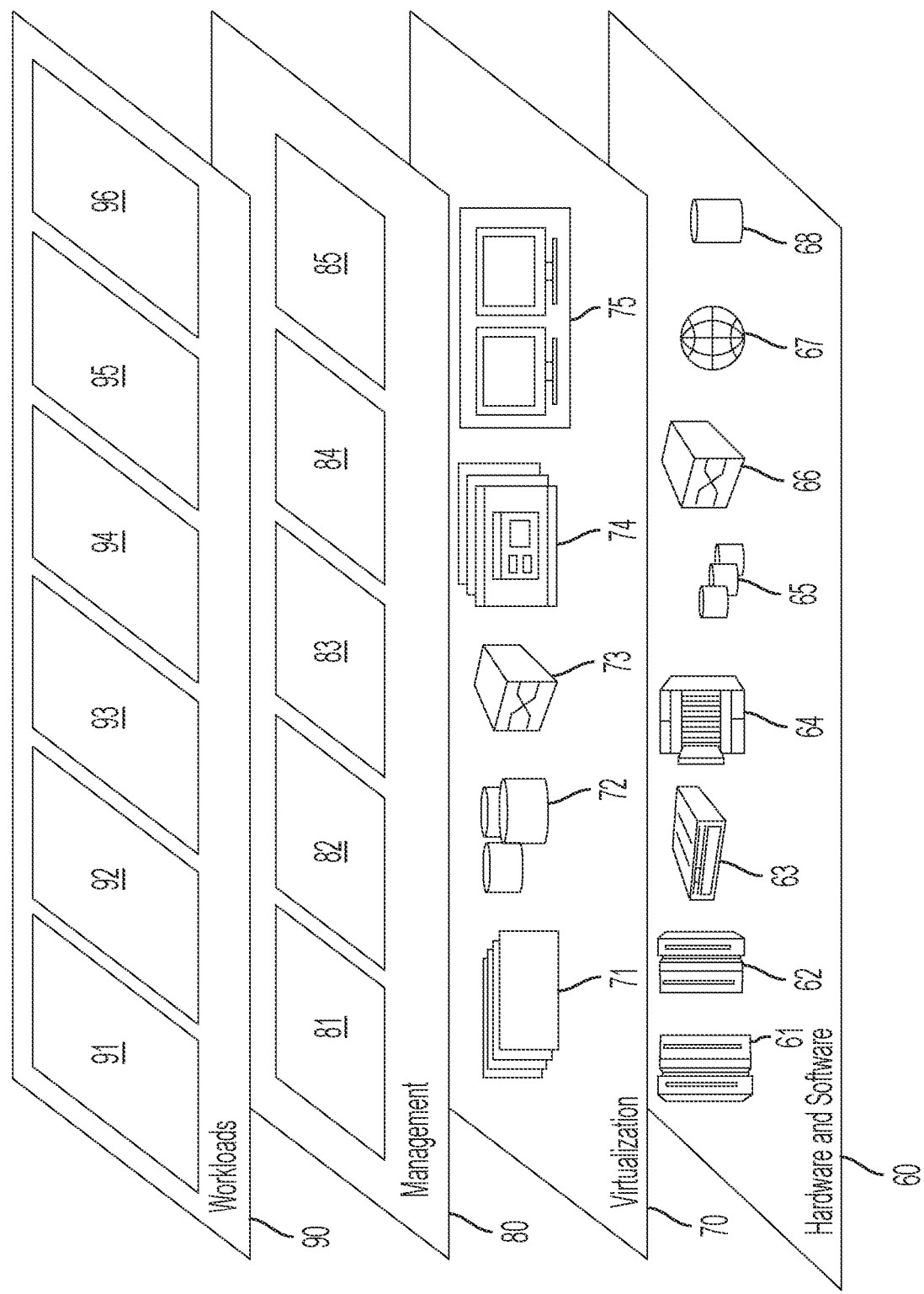
FIG. 13 depicts abstraction model layers according to an embodiment of the invention.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performing reinforcement learning to generate a video stream having a predicted, personalized, and enhanced-quality FOV 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

The terminology used herein is for the purpose of describing particular embodiments of the invention only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in signal communication", "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of predicting a displayed region of a video frame, the computer-implemented method comprising:
    using a reinforcement learning (RL) system of a processor system to generate a first set of displayed region candidates based on inputs received at the RL system from online users while the online users are actively watching video;
    using a recommendation system to rank the first set of displayed region candidates based on inputs received from a local user watching video;
    using the recommendation system to select a first highest ranked one of the first set of displayed region candidates; and
    based on the first highest ranked one of the first set of displayed region candidates, fetching a first section of a first raw video frame that matches the first highest ranked one of the first set of displayed candidate regions;
    wherein the first section of the first raw video frame comprises a first predicted display region of the video frame.

2. The computer-implemented method of claim 1 further comprising selectively applying a video enhancement technique to only the first predicted display region of the video frame.

3. The computer-implemented method of claim 1 further comprising:
    receiving from the local user an adjustment to the first predicted display region;
    using the RL system of the processor system to generate a second set of displayed region candidates based on updated inputs received from the online users while watching video; and
    using the recommendation system to rank the second set of displayed region candidates based on the adjustments to the first predicted display region received from the local user watching video.

4. The computer-implemented method of claim 3 further comprising using the recommendation system to rank the second set of displayed region candidates based on the adjustments to the first predicted display region received from the local user watching video.

5. The computer-implemented method of claim 4 further comprising using the recommendation system to select a second highest ranked one of the second set of displayed region candidates.

6. The computer-implemented method of claim 5 further comprising, based on the second highest ranked one of the second set of displayed region candidates, fetching a second section of a second raw video frame that matches the second highest ranked one of the second set of displayed candidate regions.

7. The computer-implemented method of claim 1, wherein the machine learning algorithm has been trained to perform the machine learning task using a historical target environment analysis corpus comprising information from prior analyses performed by trained interpreters on other target environments.

8. A computer system comprising a processor communicatively coupled to a memory, wherein the processor performs processor operations comprising:
    using a reinforcement learning (RL) system to generate a first set of displayed region candidates based on inputs received at the RL system from online users while the online users are actively watching video;
    using a recommendation system to rank the first set of displayed region candidates based on inputs received from a local user watching video;
    using the recommendation system to select a first highest ranked one of the first set of displayed region candidates; and
    based on the first highest ranked one of the first set of displayed region candidates, fetching a first section of a first raw video frame that matches the first highest ranked one of the first set of displayed candidate regions;
    wherein the first section of the first raw video frame comprises a first predicted display region of the video frame.

9. The computer system of claim 8, wherein the processor operations further comprise selectively applying a video enhancement technique to only the first predicted display region of the video frame.

10. The computer system of claim 8, wherein the processor operations further comprise:
    receiving from the local user an adjustment to the first predicted display region; and
    using the RL system of the processor system to generate a second set of displayed region candidates based on updated inputs received from the online users while watching video.

11. The computer system of claim 10 further comprising using the recommendation system to rank the second set of displayed region candidates based on the adjustments to the first predicted display region received from the local user watching video.

12. The computer system of claim 11 further comprising using the recommendation system to select a second highest ranked one of the second set of displayed region candidates.

13. The computer system of claim 12 further comprising, based on the second highest ranked one of the second set of displayed region candidates, fetching a second section of a second raw video frame that matches the second highest ranked one of the second set of displayed candidate regions.

14. The computer system of claim 13, wherein the second section of the second raw video frame comprises a second predicted display region of the video frame.

15. A computer program product comprising a computer readable program stored on a computer readable storage medium, wherein the computer readable program, when executed on a processor system, causes the processor system to perform processor operations comprising:
    using a reinforcement learning (RL) system to generate a first set of displayed region candidates based on inputs received at the RL system from online users while the online users are actively watching video;
    using a recommendation system to rank the first set of displayed region candidates based on inputs received from a local user watching video;
    using the recommendation system to select a first highest ranked one of the first set of displayed region candidates; and
    based on the first highest ranked one of the first set of displayed region candidates, fetching a first section of a first raw video frame that matches the first highest ranked one of the first set of displayed candidate regions;

wherein the first section of the first raw video frame comprises a first predicted display region of the video frame.

16. The computer program product of claim 15, wherein the processor operations further comprise selectively applying a video enhancement technique to only the first predicted display region of the video frame.

17. The computer program product of claim 15, wherein the processor operations further comprise:
receiving from the local user an adjustment to the first predicted display region; and
using the RL system of the processor system to generate a second set of displayed region candidates based on updated inputs received from the online users while watching video.

18. The computer program product of claim 17, wherein the processor operations further comprise using the recommendation system to rank the second set of displayed region candidates based on the adjustments to the first predicted display region received from the local user watching video.

19. The computer program product of claim 18, wherein the processor operations further comprise using the recommendation system to select a second highest ranked one of the second set of displayed region candidates.

20. The computer program product of claim 19, wherein:
the processor operations further comprise, based on the second highest ranked one of the second set of displayed region candidates, fetching a second section of a second raw video frame that matches the second highest ranked one of the second set of displayed candidate regions; and
the second section of the second raw video frame comprises a second predicted display region of the video frame.

\* \* \* \* \*